United States Patent
Motohashi

(10) Patent No.: US 11,933,466 B2
(45) Date of Patent: Mar. 19, 2024

(54) VEHICULAR LAMP HAVING A META-LENS WITH A PLURALITY NANOSTRUCTURE CELLS THAT CHANGES A PHASE OF THE LIGHT PASSING THROUGH A META REGION THEREOF

(71) Applicant: KOITO MANUFACTURING CO., LTD., Tokyo (JP)

(72) Inventor: Kazuya Motohashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/159,984

(22) Filed: Jan. 26, 2023

(65) Prior Publication Data

US 2023/0167960 A1    Jun. 1, 2023

Related U.S. Application Data

(63) Continuation of application No. PCT/JP2021/027667, filed on Jul. 27, 2021.

(30) Foreign Application Priority Data

Jul. 31, 2020  (JP) .................................. 2020-131173
Jul. 31, 2020  (JP) .................................. 2020-131174
(Continued)

(51) Int. Cl.
*F21S 41/265*    (2018.01)
*F21S 41/13*    (2018.01)
(Continued)

(52) U.S. Cl.
CPC ............. *F21S 41/265* (2018.01); *F21S 41/13* (2018.01); *F21S 41/141* (2018.01);
(Continued)

(58) Field of Classification Search
CPC ..... G02B 5/1814; B82Y 20/00; F21S 41/265; F21S 41/275
See application file for complete search history.

(56) References Cited

U.S. PATENT DOCUMENTS 5,847,877 A       12/1998  Imamura et al.
9,939,129 B2 *    4/2018   Byrnes .................. B82Y 20/00
(Continued)

FOREIGN PATENT DOCUMENTS

JP       10-242513 A1    9/1998
JP       2007-035467 A   2/2007
(Continued)

OTHER PUBLICATIONS

International Search Report of PCT/JP2021/027667 dated Sep. 21, 2021 [PCT/ISA/210].
(Continued)

*Primary Examiner* — Robert J May
(74) *Attorney, Agent, or Firm* — Sughrue Mion, PLLC

(57) ABSTRACT

A vehicular lamp (1) includes a light source unit (20), and a meta-lens (30) in which a plurality of cells (33) including a nanostructure (35) smaller than a longest wavelength of light (L) emitted from the light source unit (20) are arranged, the meta-lens (30) having a main surface (31s) as a meta region through which the light L emitted from the light
(Continued)

source unit (20) passes, and the main surface (31s) as the meta region changes a phase distribution of the light (L) passing through the main surface (31s).

11 Claims, 10 Drawing Sheets

(30) Foreign Application Priority Data

| | | |
|---|---|---|
| Jul. 31, 2020 | (JP) | 2020-131175 |
| Jul. 31, 2020 | (JP) | 2020-131176 |
| Jul. 31, 2020 | (JP) | 2020-131177 |

(51) Int. Cl.
*F21S 41/141* (2018.01)
*F21S 41/275* (2018.01)
*F21V 5/04* (2006.01)
*F21Y 115/10* (2016.01)

(52) U.S. Cl.
CPC .............. *F21S 41/275* (2018.01); *F21V 5/04* (2013.01); *F21Y 2115/10* (2016.08)

(56) References Cited

U.S. PATENT DOCUMENTS

| | | | |
|---|---|---|---|
| 11,662,081 B2* | 5/2023 | Tamma | G02B 27/0172 |
| | | | 359/629 |
| 2007/0025116 A1 | 2/2007 | Tsukamoto et al. | |
| 2013/0329440 A1 | 12/2013 | Tsutsumi et al. | |
| 2017/0082263 A1 | 3/2017 | Byrnes et al. | |
| 2019/0137665 A1 | 5/2019 | You et al. | |

FOREIGN PATENT DOCUMENTS

| | | |
|---|---|---|
| JP | 2012-169189 A | 9/2012 |
| JP | 2018-537804 A | 12/2018 |
| JP | 2019-086765 A | 6/2019 |

OTHER PUBLICATIONS

Extended European Search Report dated Dec. 7, 2023 in Application No. 21851126.9.

\* cited by examiner

VEHICULAR LAMP HAVING A META-LENS WITH A PLURALITY NANOSTRUCTURE CELLS THAT CHANGES A PHASE OF THE LIGHT PASSING THROUGH A META REGION THEREOF

TECHNICAL FIELD

The present invention relates to a vehicular lamp.

BACKGROUND ART

As a vehicular lamp typified by an automobile headlight, a vehicular lamp including a projection lens through which light emitted from a light source unit passes is known. For example, Patent Literature 1 below discloses such a vehicular lamp.

In the vehicular lamp of the following Patent Literature 1, a divergence angle of light emitted from a light source unit and incident on a projection lens is adjusted, and the light is emitted to the front of the vehicle.

In addition, for example, Patent Literature 2 below discloses a vehicular lamp that widens a light distribution pattern. In this vehicular lamp, an additional lens is disposed near the front of a peripheral portion of a projection lens. The additional lens deflects the light that has passed through the projection lens in a direction horizontally away from an optical axis. As a result, the light distribution pattern projected from the vehicular lamp to the outside becomes a light distribution pattern in which left and right ends of the light distribution pattern projected from the vehicular lamp to the outside when the additional lens is not arranged are widened to the left and right sides, and is widened as compared with the light distribution pattern when the additional lens is not arranged.

There is also known a vehicular lamp including a light emitting module in which a light source unit includes a semiconductor light emitting element such as a light emitting diode (LED). In addition, various configurations have been studied in order to set the light emitted from such a light emitting module to a desired color. For example, Patent Literature 3 below discloses a light emitting module including an LED and a phosphor that is irradiated with a part of light emitted from the LED and emits light having a wavelength different from that of the light. In this light emitting module, the light emitted from the phosphor and another part of the light emitted from the LED are multiplexed, and light of a color different from the color of the light emitted from the LED is emitted. In addition, a spectral distribution of the light emitted from the light emitting module includes two peaks, a wavelength at one peak is substantially the same as a peak wavelength of the light emitted from the LED, and a wavelength at the other peak is substantially the same as a peak wavelength of the light emitted from the phosphor.

[Patent Literature 1] JP 2012-169189 A
[Patent Literature 2] JP 2007-35467 A
[Patent Literature 3] JP 10-242513 A

SUMMARY OF INVENTION

In the vehicular lamp as in Patent Literature 1, a size of the light distribution pattern of the emitted light can be easily set to a desired size. By the way, due to diversification of vehicle designs and the like, there is a demand for downsizing of vehicular lamps.

Therefore, an object of the present invention is to provide a vehicular lamp that can be downsized.

In order to achieve the above object, according to the present invention, there is provided a vehicular lamp including:

a light source unit; and a meta-lens in which a plurality of cells including a nanostructure smaller than a longest wavelength of light emitted from the light source unit are arranged, the meta-lens having a meta region through which the light emitted from the light source unit passes, in which the meta region changes a phase distribution of the light passing through the meta region.

In a projection lens in a vehicular lamp, generally, at least one of an incident surface and an emission surface is a curved surface, and a divergence angle of light emitted from a light source unit is adjusted by adjusting a shape of the curved surface. Therefore, in such a projection lens, a certain thickness is required to form the curved surface. Meanwhile, the meta-lens in the vehicular lamp can change the phase distribution of the light from the light source unit and adjust the divergence angle of the light by adjusting the arrangement of the plurality of cells, the size of the nanostructure in each cell, and the like. Therefore, even when a curvature of the meta region is made smaller than a curvature of the curved surface of the projection lens, the meta-lens can adjust the divergence angle of the light from the light source unit, and can be made thinner than the projection lens. Therefore, according to this vehicular lamp, the size can be reduced as compared with the case where the divergence angle of the light from the light source unit is adjusted by the projection lens.

An incident surface of the meta-lens on which the light from the light source unit is incident may be curved outward in a convex shape to refract the light so that a divergence angle of the light becomes small, and the light incident on the incident surface may pass through the meta region.

Generally, when the divergence angle of light incident on the meta region increases, the design of the meta region tends to be complicated. In the meta-lens in the vehicular lamp, the light from the light source unit is incident on the meta region after the divergence angle is reduced by the curved incident surface. Therefore, for example, when the divergence angle of the light from the light source unit is reduced to a predetermined divergence angle by the meta-lens, the divergence angle of the light incident on the meta region can be reduced as compared with the case where the incident surface on which the light from the light source unit is incident is a flat surface. Therefore, according to this vehicular lamp, it is possible to suppress the complexity of the design of the meta region, and it is particularly useful when the divergence angle of the light from the light source unit is reduced.

Alternatively, an incident surface of the meta-lens on which the light from the light source unit is incident may be provided with a plurality of grooves and may diffract the light so that a divergence angle of the light becomes small, and the light incident on the incident surface may pass through the meta region.

In the meta-lens in the vehicular lamp, the light from the light source unit is incident on the meta region after the divergence angle is reduced by the incident surface. Therefore, for example, when the divergence angle of the light from the light source unit is reduced to a predetermined divergence angle by the meta-lens, the divergence angle of the light incident on the meta region can be reduced as compared with the case where the incident surface on which the light from the light source unit is incident is a flat surface. Therefore, according to this vehicular lamp, it is possible to suppress the complexity of the design of the meta region, and it is particularly useful when the divergence angle of the light from the light source unit is reduced.

The vehicular lamp may further include a protective member having light transmittance and covering the meta region.

With such a configuration, it is possible to suppress intrusion of dust or the like between the respective nanostructures, adhesion of dust or the like to the nanostructures, and damage to the nanostructures, and it is possible to appropriately adjust the divergence angle of light from the light source unit.

In this case, the protective member may have a refractive index lower than the refractive index of the meta-lens, and fill a space between the nanostructures.

The meta region may change a phase distribution of a reference light so that the phase distribution of the reference light emitted from the meta-lens becomes a specific phase distribution obtained by dividing a predetermined phase distribution by 2π when the reference light parallel to a reference axis orthogonal to the meta region is incident on the meta region at a specific position in the meta region, the predetermined phase distribution is a phase distribution in which a phase delay amount (rad) decreases and a reduction rate of the phase delay amount increases as the distance from the reference axis increases, the specific phase distribution may have a plurality of peaks, and the plurality of cells may be arranged such that two or more of the cells are located between the peaks adjacent to each other in a direction away from the specific position when viewed along the reference axis.

The meta region is configured such that the phase distribution of the reference light becomes the predetermined phase distribution, so that the divergence angle of the light that passes through the meta region and is emitted from the meta-lens can be reduced. Here, in a case where the phase of the light is delayed by an integral multiple of 2π, a wave surface of the light can be regarded as being the same as a wave surface of light having no phase delay. Therefore, even when the meta region is configured such that the phase distribution of the reference light becomes the specific phase distribution, the divergence angle can be reduced. Therefore, in this vehicular lamp, the divergence angle of the light from the light source unit can be reduced by the meta-lens. Furthermore, as described above, the specific phase distribution includes a remainder obtained by dividing, by 2π, a predetermined phase distribution in which the phase delay amount and the increase rate of the phase delay amount increase with increasing distance from the specific position along the meta region, and has a plurality of peaks. Therefore, the phase delay amount in the specific phase distribution periodically repeats a change in which the phase delay amount increases from zero with distance from the specific position and approaches 2π to zero as much as possible. As the number of cells arranged with respect to one cycle of the change described above decreases, deviation between the phase distribution changed by the meta region and the specific phase distribution increases, and a ratio of the energy of the light emitted from the meta region at the divergence angle according to the specific phase distribution with respect to the energy of the light incident on the meta region tends to decrease. In this vehicular lamp, two or more cells are arranged for one cycle of this change. By arranging the cells in this manner, the loss of light energy due to the meta-lens can be easily reduced to such an extent that it can be suitably used for a lens in a vehicular lamp.

In a case where the plurality of cells are arranged as described above, the specific phase distribution may have three or more peaks, and the number of cells located between the peaks may decrease with distance from the specific position.

When the plurality of cells are arranged as described above, it is preferable that a shape of the nanostructure has a columnar shape, and the number of cells located between the peaks is three or more. The inventor has found that with such a configuration, a ratio of energy of light emitted from the meta region at a divergence angle according to a specific phase distribution to energy of light incident on the meta region can be set to 60% or more.

A minimum width of the meta region may be 10 mm or more.

Generally, by enlarging the lens, the amount of light emitted from the lens can be easily increased. With the above configuration, the light distribution pattern of the light emitted from the meta-lens can be easily set to the brightness required as the light distribution pattern of the light emitted from a vehicle headlight. Examples of the light distribution pattern of the light emitted from the vehicle headlight include light distribution patterns of a low beam and a high beam.

The meta region may change a phase distribution of the light passing through the meta region such that coma aberration is generated, and widen a divergence angle of the light passing through the meta region in a right-left direction of a light distribution pattern formed by the light compared to a case where the coma aberration is not generated.

The coma aberration is an aberration in which a point image on an image plane is not formed at one point, but spreads and forms a comet-like tail. In the image plane, the light does not radially diffuse from the point image to the periphery of the point image but extends in a certain direction from the point image due to the coma aberration. As a result, it can be understood that the divergence angle of light is widened by coma aberration. In the meta-lens, even when the coma aberration is not generated, the divergence angle of light can be widened by adjusting the arrangement of the plurality of cells and the size and shape of the nanostructure in each cell. However, in the meta region of the present invention, even when the divergence angle is the same as the divergence angle widened when the coma aberration is not generated, the divergence angle can be further widened in the right-left direction by the above-described extension of the light due to the coma aberration.

Therefore, the light distribution pattern can be further widened in the right-left direction than the light distribution pattern projected from the meta-lens in which the divergence angle of the light is widened without generating the coma aberration.

In addition, in general, the projection lens as described above having a curved surface is designed to suppress the coma aberration. Therefore, in the case of using the projection lens, the spread of the divergence angle of the light from the light source unit is suppressed, and the spread of the light distribution pattern projected to the outside of the vehicular lamp is suppressed. Meanwhile, in the meta region of the meta-lens configured as the projection lens, since the divergence angle is widened by the coma aberration, the light distribution pattern can be widened more than the light distribution pattern projected from the projection lens.

In the case that the phase distribution of the light passing through the meta region is changed such that the coma aberration is generated in the meta region, a spreading amount of the divergence angle spreading in a left direction due to the coma aberration and a spreading amount of the divergence angle spreading in a right direction due to the coma aberration may be the same. With such a configuration, the spreading amounts of a right end and a left end of the light distribution pattern can be the same, and the design of the meta-lens can be facilitated as compared with the case where the spreading amounts are not the same.

Alternatively, in the meta region, one of a spreading amount of the divergence angle spreading in the left direction by the coma aberration and a spreading amount of the divergence angle spreading in the right direction by the coma aberration may be made larger than the other. With such a configuration, one of the spreading amount at the right end of the light distribution pattern and the spreading amount at the left end of the light distribution pattern is larger than the other, and a driver of a vehicle can more easily visually recognize an object located on the side where the light distribution pattern is widened.

In the case that the meta region changes the phase distribution of the light passing through the meta region such that the coma aberration is generated, the meta region may widen the divergence angle of the light passing through the meta region in an up-down direction of the light distribution pattern formed by the light compared with the case that the coma aberration is not generated. With such a configuration, the driver of the vehicle can easily visually recognize an object such as a guide sign or a road surface.

In the case that the phase distribution of the light passing through the meta region is changed such that the coma aberration is generated in the meta region, the spreading amount of the divergence angle spreading in the right-left direction due to the coma aberration may be set larger than the spreading amount of the divergence angle spreading in the up-down direction due to the coma aberration. With such a configuration, the light distribution pattern spreads more in the right-left direction than in the up-down direction without changing the amount of light passing through the meta-lens, and the spread of the field of view of the driver can be secured in the right-left direction than in the up-down direction by the light distribution pattern.

Further, in the meta region, a bending force of the meta region that bends infrared light included in the light passing through the meta region may be made smaller than a bending force of the meta region that bends visible light included in the light passing through the meta region.

As described above, the meta region changes the phase distribution of the light passing through the meta region. This phase distribution changes according to the arrangement of the plurality of cells, the size and shape of the nanostructure in each cell, and the like. Therefore, by adjusting these, the phase distribution of the light passing through the meta region is changed, and the bending force of the meta region that bends the infrared light included in the light passing through the meta region is made smaller than the bending force of the meta region that bends the visible light included in the light. The bending force indicates a force with which the meta region bends the light passing through the meta region. The smaller the bending force, the smaller the bending angle of the light passing through the meta region, and the light focusing is suppressed. Therefore, for example, even when sunlight enters the inside of the vehicular lamp from the outside of the vehicular lamp, in the vehicular lamp, the bending angle of the infrared light included in the sunlight is smaller than the bending angle of the visible light included in the sunlight due to the bending force. Therefore, according to the vehicular lamp, as compared with the projection lens, the condensing of the infrared light traveling from the meta-lens to the light source unit can be suppressed in the meta region. When the condensing of the infrared light is suppressed, deterioration of the light source unit due to the condensing of the infrared light can be suppressed as compared with the projection lens.

Furthermore, in a case where the bending force of the meta region that bends infrared light is smaller than the bending force of the meta region that bends visible light, the meta region may be configured such that a phase modulation amount of the infrared light is less than 0.6 times a phase modulation amount of the visible light in the visible light and the infrared light in which a wavelength ratio is 1:1.5.

For example, in a refractive lens made of acrylic, when a bending force of a refractive lens that bends visible light is 1, a bending force of a refractive lens that bends infrared light is approximately 0.98. In addition, for example, in a refractive lens made of polycarbonate, when the bending force of the refractive lens that bends visible light is 1, the bending force of the refractive lens that bends infrared light is approximately 0.98. Therefore, the bending force of the refractive lens that bends infrared light is approximately 0.98 times the bending force of the refractive lens that bends visible light regardless of whether the refractive lens is acrylic or polycarbonate. In this case, the refractive lens easily condenses the infrared light. The bending force of the meta region is substantially proportional to a value of a product of the phase modulation amount of the light passing through the meta region and the wavelength of the light. In this vehicular lamp, in visible light and infrared light having a wavelength ratio of 1:1.5, the phase modulation amount of the infrared light is less than 0.6 times the phase modulation amount of the visible light, so that the bending force of the meta region that bends the infrared light is less than 0.9 times the bending force of the meta region that bends the visible light. When the bending force of the meta region that bends the infrared light and the bending force of the refractive lens that bends the infrared light are compared with each bending force that bends the visible light, the bending force of the meta region that bends the infrared light is smaller than the bending force of the refractive lens that bends the infrared light. Therefore, in this vehicular lamp, the condensing of the infrared light can be suppressed more than the refractive lens.

When the bending force of the meta region that bends infrared light is smaller than the bending force of the meta region that bends visible light, a longest wavelength of the visible light may be 660 nm, and a shortest wavelength of the infrared light may be 1000 nm.

In addition, when the bending force of the meta region that bends the infrared light is smaller than the bending force of the meta region that bends the visible light, the shape of the nanostructure may be a columnar shape. With such a configuration, even when the visible light from the light source unit is randomly polarized light, the visible light can be efficiently bent.

At least one resonance wavelength in the meta-lens may be 800 nm or more and less than 2400 nm.

In the meta-lens, a phenomenon may occur in which the transmittance of light having a specific wavelength is extremely lower than the transmittance of light having other wavelengths, and it is generally known that there are a plurality of specific wavelengths. These specific wavelengths are wavelengths at which opacity of the light in the meta-lens peaks, and are called resonance wavelengths. These resonance wavelengths are determined according to the size and shape of the nanostructure in each cell, the refractive index of the material constituting the nanostructure, and the like. In this vehicular lamp, as described above, at least one resonance wavelength in the meta-lens is 800 nm or more and less than 2400 nm. In general, sunlight near the ground includes light in a wavelength band of 800 nm to 2400 nm. Therefore, according to this vehicular lamp, when sunlight passes through the meta-lens and is emitted to the light source unit, an irradiation amount of light having a wavelength of 800 nm to 2400 nm in the sunlight to the light source unit can be reduced as compared with a case where the meta-lens is used as projection lenses. Therefore, according to this vehicular lamp, the amount of heating of the light source unit by sunlight can be reduced and deterioration of the light source unit by sunlight can be suppressed as compared with a case where the meta-lens are used as projection lenses.

When at least one resonance wavelength in the meta-lens is 800 nm or more and less than 2400 nm, the at least one resonance wavelength may be included in a range of 800 nm or more and less than 900 nm.

In general, an intensity of sunlight near the ground tends to decrease as the wavelength becomes longer in a wavelength band of 800 nm or more. Note that the spectral distribution of sunlight has a plurality of valleys in which the intensity rapidly decreases. The minimum intensity at this valley is, for example, 50% or less of the intensity in the vicinity of the valley. Such a valley tends not to be located in the range of 800 nm or more and less than 900 nm. For this reason, with the above configuration, it is easy to reduce the amount of heating of the light source unit by sunlight when the light source unit is irradiated with the sunlight passing through the meta-lens.

In addition, in a case where at least one resonance wavelength in the meta-lens is 800 nm or more and less than 2400 nm, the spectral distribution of the light emitted from the light source unit may have a plurality of peaks, and the plurality of resonance wavelengths may be different from the respective wavelengths of the plurality of peaks.

The light having the wavelength at the peak of the spectral distribution tends to greatly affect a color tone of the light emitted from the vehicular lamp. Therefore, according to this vehicular lamp, it is possible to suppress a decrease in the transmittance of light having a wavelength that greatly affects a color tone of the emitted light at the meta-lens, and to emit light having a desired color tone.

In this case, all of the plurality of resonance wavelengths may not be included in the wavelength band of the light emitted from the light source unit.

According to this vehicular lamp, it is possible to emit light of a desired color tone as compared with a case where at least one resonance wavelength is included in the wavelength band of the light emitted from the light source unit.

Further, when at least one resonance wavelength in the meta-lens is 800 nm or more and less than 2400 nm, the meta-lens may reduce a divergence angle of the light from the light source unit that passes through the meta-lens.

Further, a spectral distribution of the light emitted from the light source unit may have a plurality of peaks, and a plurality of resonance wavelengths in the meta-lens may be different from respective wavelengths of the plurality of peaks.

In this vehicular lamp, as described above, since the spectral distribution of the light emitted from the light source unit has the plurality of peaks, the color tone of the emitted light can be set to a desired color tone as compared with the case where the spectral distribution has only one peak. Further, in this vehicular lamp, as described above, the plurality of resonance wavelengths in the meta-lens are different from the respective wavelengths of the plurality of peaks. The light of each wavelength in the plurality of peaks greatly affects the color tone of the light emitted from the vehicular lamp. Therefore, according to this vehicular lamp, it is possible to suppress a decrease in the transmittance of light having a wavelength that greatly affects a color tone of the emitted light at the meta-lens, and to emit light having a desired color tone.

When the spectral distribution of the light emitted from the light source unit has a plurality of peaks, at least one of the plurality of resonance wavelengths may exceed a shortest wavelength and be less than a longest wavelength of respective wavelengths of the plurality of peaks.

In a case where a plurality of resonance wavelengths do not include a resonance wavelength that exceeds the shortest wavelength and is less than the longest wavelength, design of the size and shape of the nanostructure in each cell, the arrangement of the cells, and the like tends to be complicated. Therefore, by adopting the above-described configuration, it is possible to suppress the complexity of these designs.

In this case, the wavelength of the light having the minimum intensity between the peaks adjacent to each other may be the same as the at least one of the plurality of resonance wavelengths.

With such a configuration, it is possible to suppress a decrease in the amount of emitted light as compared with a case where the wavelength of light excluding light having the minimum intensity between peaks and the resonance wavelength are the same.

In addition, in a case where the spectral distribution of light emitted from the light source unit has the plurality of peaks, the plurality of resonance wavelengths may include a specific resonance wavelength included in a wavelength band of the light from the light source unit, and a ratio of an intensity of light of the specific resonance wavelength in the light to a maximum intensity in an entire spectral distribution of the light may be 0.1 or less.

With such a configuration, a decrease in the amount of emitted light can be suppressed as compared with a case where the ratio exceeds 0.1.

As described above, according to the present invention, it is possible to provide a vehicular lamp that can be downsized.

DESCRIPTION OF EMBODIMENTS

Figure 1:
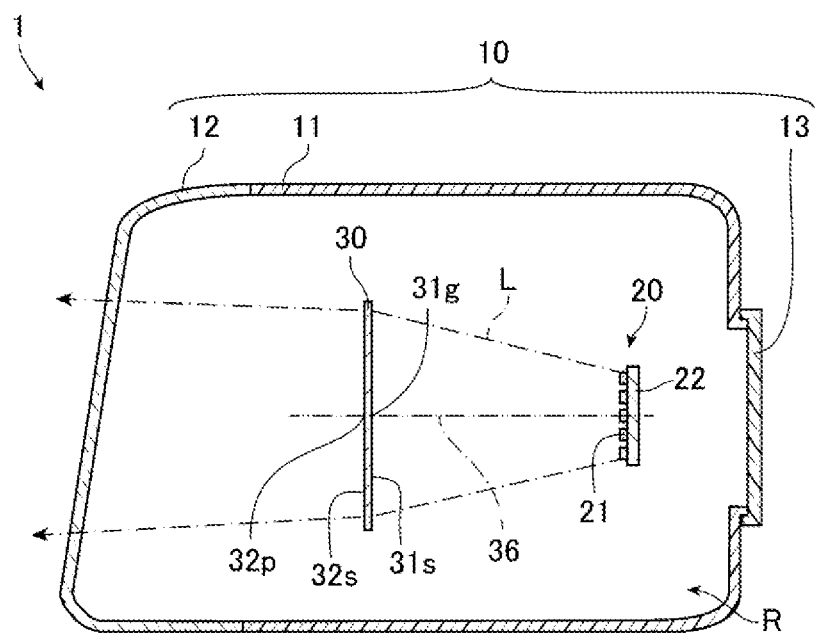
FIG. 1 is a cross-sectional view schematically illustrating a vehicular lamp according to a first embodiment of the present invention.

Hereinafter, preferred embodiments of a vehicular lamp according to the present invention will be described in detail with reference to the drawings. Embodiments exemplified below are intended to facilitate understanding of the present invention and are not intended to limit the present invention. The present invention can be modified and improved from the following embodiments without departing from the gist thereof. In addition, in the present invention, constituent elements in the following exemplary embodiments may be appropriately combined. In the drawings referred to below, dimensions of each member may be changed for easy understanding.

First Embodiment

FIG. 1 is a view illustrating a vehicular lamp according to a first embodiment of the present invention, and is a view schematically illustrating a cross section of the vehicular lamp in a vertical direction. A vehicular lamp 1 of the present embodiment is a headlight for an automobile. A headlight for an automobile is generally provided in each of right and left directions in front of a vehicle. In the present specification, "right" means the right side in a traveling direction of the vehicle, and "left" means the left side in the traveling direction of the vehicle. Each of the right and left headlights has the same configuration except that the shape is substantially symmetrical in the right-left direction. Therefore, in the present embodiment, one headlight will be described. As illustrated in FIG. 1, the vehicular lamp 1 of the present embodiment includes a housing 10, a light source unit 20, and a meta-lens 30 as main components.

The housing 10 of the present embodiment includes a lamp housing 11, a front cover 12, and a back cover 13 as main components. The front of the lamp housing 11 is open, and the front cover 12 is fixed to the lamp housing 11 so as to close the opening. An opening smaller than the front is formed behind the lamp housing 11, and the back cover 13 is fixed to the lamp housing 11 so as to close the opening.

A space formed by the lamp housing 11, the front cover 12 closing the front opening of the lamp housing 11, and the back cover 13 closing the rear opening of the lamp housing 11 is a lamp chamber R, and the light source unit 20 and the meta-lens 30 are accommodated in the lamp chamber R. The back cover 13 is openable and closable or detachable with respect to the lamp housing 11 for replacement of the light source unit 20 and the meta-lens 30 through the rear opening of the lamp housing 11. The front cover 12 is made of a material having translucency, and light emitted from the light source unit 20 and passing through the meta-lens 30 passes through the front cover 12. The lamp housing 11 and the back cover 13 are made of resin, for example.

Figure 2:
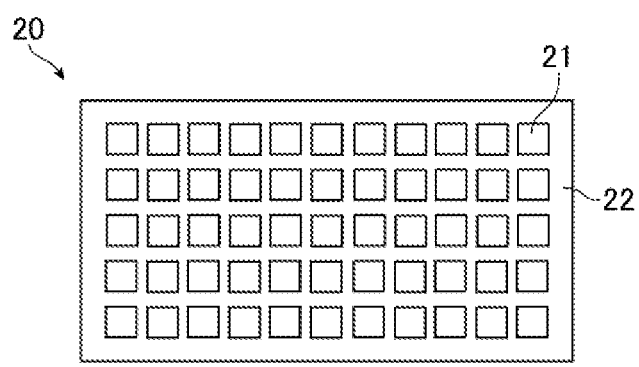
FIG. 2 is a front view schematically illustrating a light source unit illustrated in FIG. 1.

FIG. 2 is a front view schematically illustrating the light source unit 20 illustrated in FIG. 1. In the present embodiment, as illustrated in FIGS. 1 and 2, the light source unit 20 includes a plurality of light emitting elements 21 that emit light and a circuit board 22 on which the plurality of light emitting elements 21 is mounted. Note that, in FIGS. 1 and 2, only one light emitting element 21 is denoted by a reference sign, and the reference signs of the other light emitting elements 21 are omitted for the sake of visibility. The plurality of light emitting elements 21 are arranged in a matrix form to form rows in the up-down direction and the right-left direction, and emit light forward. Each of the plurality of light emitting elements 21 can individually change the amount of light emitted by the power supplied to each of the light emitting elements 21. In addition, these light emitting elements 21 are fluorescent light emitting diodes (LEDs) that emit white light, the light source unit 20 is a so-called LED array, and the light emitted from the light source unit 20 has a predetermined wavelength band. Note that the number and configuration of the light emitting elements 21 are not particularly limited. For example, the light emitting element 21 may include a plurality of LEDs that emit light having different wavelengths, or may include a plurality of laser diodes (LDs) that emit light having different wavelengths.

Such a light source unit 20 can emit light having a predetermined light distribution pattern by selecting the light emitting element 21 that emits light, and can change the outer shape of the predetermined light distribution pattern by changing the selection. Furthermore, the light source unit 20 can adjust an intensity distribution of light in a predetermined light distribution pattern by adjusting the amount of light emitted from each light emitting element 21. That is, the light source unit 20 can emit light having a predetermined light distribution pattern corresponding to the amount of light emitted from the plurality of light emitting elements 21, and can change the light distribution pattern of the emitted light. Note that the light source unit 20 may not be able to change the light distribution pattern of the emitted light.

The wavelength of the light L emitted from the light source unit 20 of the present embodiment is included in the wavelength band of visible light. The wavelength band of visible light is approximately 380 nm to 780 nm. Since the light L emitted from the light source unit 20 is light emitted from the plurality of light emitting elements 21, the wavelength of the light emitted from each light emitting element 21 is substantially the same as the wavelength of the light L emitted from the light source unit 20. The wavelength of the light L may not be included in the wavelength band of visible light.

The meta-lens 30 according to the present embodiment is a plate-like member, and is configured to adjust a divergence angle of light passing in a thickness direction. The meta-lens 30 is disposed in front of the light source unit 20, and light L emitted from the light source unit 20 is incident on one planar main surface 31s, and is emitted from other planar main surface 32s. Therefore, the main surface 31s is an incident surface on which the light L from the light source unit 20 is incident, and the main surface 32s is an emission surface from which the light L from the light source unit 20 incident on the main surface 31s is emitted.

Figure 3:
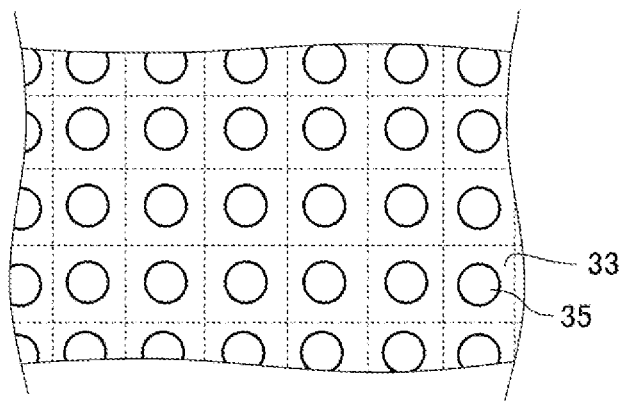
FIG. 3 is an enlarged front view illustrating a part of one main surface of a meta-lens illustrated in FIG. 1.

FIG. 3 is an enlarged front view illustrating a part of one main surface 31s of meta-lens 30 in FIG. 1. As illustrated in FIG. 3, the main surface 31s has a plurality of cells 33 formed by being divided in two different directions, and the nanostructures 35 are provided in the respective cells 33. In FIG. 3, a boundary between adjacent cells 33 is indicated by a broken line. In addition, only one cell 33 and one nanostructure 35 are denoted by reference numerals, and reference numerals of other cells 33 and nanostructures 35 are omitted for the sake of visibility. In the present embodiment, the plurality of cells 33 are arranged over the entire main surface 31s, and it can be understood that the entire main surface 31s is a meta region in which the plurality of cells 33 including the nanostructure 35 are arranged. The meta-lens 30 has a disk shape, and the plurality of cells 33 are arranged in a radial direction and a circumferential direction based on the center of gravity 31g of main surface 31s. At the center of gravity 31g as a specific position, a reference axis 36 orthogonal to the main surface 31s intersects with the light source unit 20. The light emitting element 21 of the light source unit 20 is disposed along a plane substantially perpendicular to the reference axis 36. The meta-lens 30 has a diameter of 10 mm or more, for example, 50 mm. Therefore, a minimum width of the meta region is 10 mm or more. A region of the main surface 31s excluding the nanostructure 35 is a flat surface, and the nanostructure 35 is a protrusion extending from the main surface 31s toward the light source unit 20. Such a nanostructure 35 is configured as a part of the meta-lens 30 by ultrafine processing on the main surface 31s, and is integrated with the meta-lens 30.

The arrangement of the plurality of cells 33 and the positions and ranges of the meta regions are not particularly limited. For example, the meta region may be a part of the main surface 31s, or may be at least a part of the main surface 32s opposite to the light source unit 20 side. Further, the meta region may be at least a part of the main surface 31s and at least a part of the main surface 32s. In addition, the shape of the cell 33 illustrated in FIG. 3 is substantially quadrangular, but is not particularly limited. In addition, the sizes and shapes of the plurality of cells 33 may be different from each other. Furthermore, the sizes of the meta-lens 30 and the meta region are not particularly limited, and for example, the diameter of the meta-lens 30 may be smaller than 10 mm. The outer shape of meta-lens 30 is not particularly limited, and may be, for example, a quadrangular shape.

In the present embodiment, the shape of the nanostructure 35 is a columnar shape, and the diameter is smaller than the longest wavelength of light emitted from the light source unit 20. Note that the width of the nanostructure 35 may be smaller than the longest wavelength of light emitted from the light source unit 20, and the shape of the nanostructure 35 is not particularly limited. For example, the shape of the nanostructure 35 may be a quadrangular prism shape or a C-shape. Furthermore, the nanostructure 35 may include a pair of quadrangular prisms or the like arranged at a predetermined interval. In addition, the shapes of the nanostructures 35 in the respective cells 33 may be different. In addition, a plurality of nanostructures 35 may be provided in each cell 33, and the number of nanostructures 35 in each cell 33 may be different. Examples of the material constituting the meta-lens 30 include glass and resin. The materials constituting the nanostructure 35 and the portion other than the nanostructure 35 may be the same or different.

The cell 33 including such a nanostructure 35 can modulate the phase of the light L passing through the cell 33. Then, by adjusting the arrangement of the plurality of cells 33 and the size, shape, and the like of the nanostructure 35 in each cell 33, the phase distribution of the light L passing through the meta region can be changed, and the divergence angle of the white light L passing through the meta-lens 30 can be changed. In the present embodiment, the arrangement of the plurality of cells 33 and the size, shape, and the like of the nanostructure 35 in each cell 33 are adjusted so that the divergence angle of the light L decreases to a predetermined divergence angle. Therefore, it can be understood that the meta region is configured to modulate the phase of the light L such that the divergence angle of the light L becomes a predetermined divergence angle.

Figure 4:
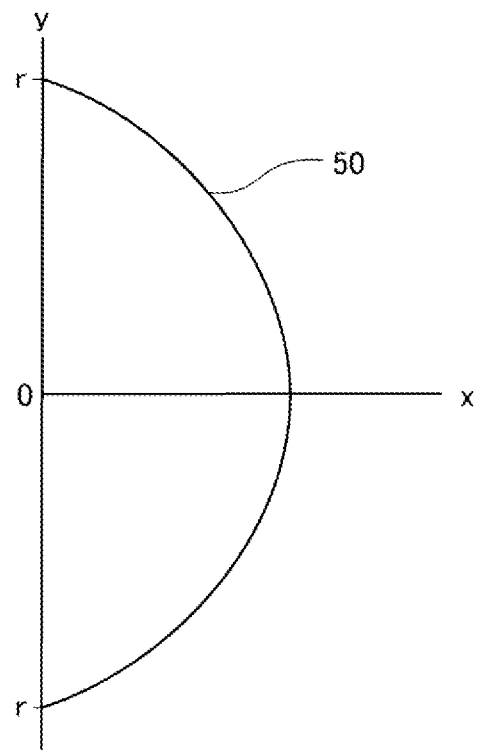
FIG. 4 is a diagram schematically illustrating a part of a predetermined phase distribution in the first embodiment.

Specifically, the meta region of the present embodiment is configured such that, when the reference light parallel to the reference axis 36 is incident on the meta region, the phase distribution of the reference light emitted from the meta-lens 30 becomes the specific phase distribution obtained by dividing the predetermined phase distribution 50 in FIG. 4 by 2π. FIG. 4 is a diagram schematically illustrating a part of the predetermined phase distribution 50 in the present embodiment, and is a diagram illustrating the predetermined phase distribution 50 on a vertical plane including the reference axis 36. In addition, the phase distribution of the reference light emitted from the meta-lens 30 is a phase distribution in a virtual plane perpendicular to the reference axis 36, and in the present embodiment, the virtual plane is a phase distribution in a plane along the main surface 32s which is an emission surface of the meta-lens 30. In FIG. 4, an x-axis represents a phase delay amount (rad), a y-axis represents a distance from an intersection 32p between the reference axis 36 and the main surface 32s in a direction perpendicular to the reference axis 36, and r represents a radius of the meta-lens 30. As illustrated in FIG. 4, the predetermined phase distribution 50 on the vertical plane including the reference axis 36 is a curve in which the phase delay amount decreases and a reduction rate of the phase delay amount increases with increasing distance from the reference axis 36 in the direction perpendicular to the reference axis 36. Although not illustrated, the predetermined phase distribution 50 on any plane including the reference axis 36 is a curve similar to the predetermined phase distribution 50 illustrated in FIG. 4. Therefore, the predetermined phase distribution 50 can be understood to be a phase distribution in which the phase delay amount decreases and the reduction rate of the phase delay amount increases as the distance from the reference axis 36 increases. Here, since the meta region is configured such that the phase distribution of the reference light becomes the predetermined phase distribution 50, the divergence angle of the light passing through the meta region and emitted from the meta-lens 30 can be reduced. Furthermore, in a case where the phase of the light is delayed by an integral multiple of $2n$, the wave surface of the light can be regarded as being the same as the wave surface of the light having no phase delay. Therefore, even in the meta-lens 30 of the present embodiment in which the meta region is configured such that the phase distribution of the reference light becomes a specific phase distribution obtained by dividing the predetermined phase distribution 50 by $2n$, the divergence angle of the light L can be reduced. Note that the predetermined phase distribution 50 only needs to be a phase distribution in which the phase delay amount decreases and the reduction rate of the phase delay amount increases as the distance from the reference axis 36 increases, and the phase delay amount and the reduction rate of the phase delay amount are adjusted according to the adjustment degree of the divergence angle and the like. Further, the reference axis 36 is not limited to one passing through the center of gravity 31g, and may be one orthogonal to the meta region at a specific position in the meta region.

Figure 5:
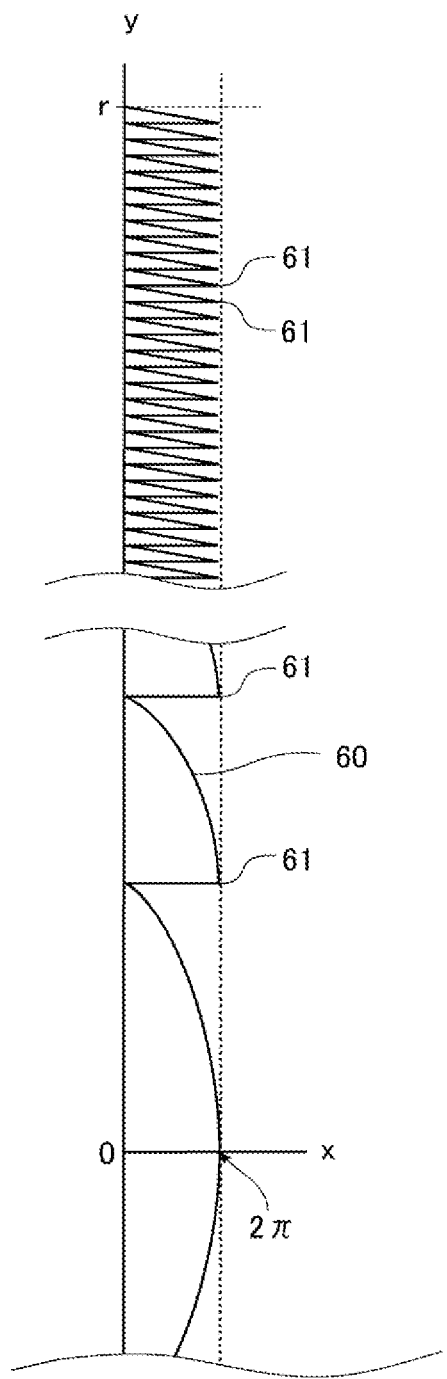
FIG. 5 is a diagram schematically illustrating a part of a specific phase distribution in the first embodiment.

In addition, in the present embodiment, as illustrated in FIG. 5, a specific phase distribution 60 obtained by dividing a predetermined phase distribution 50 by $2\pi$ has a plurality of peaks 61. FIG. 5 is a diagram schematically illustrating a part of the specific phase distribution 60 in the present embodiment, and is a diagram illustrating a part of the specific phase distribution 60 on a vertical plane including the reference axis 36. In FIG. 5, an x-axis represents a phase delay amount (rad), a y-axis represents a distance from an intersection 32p between the reference axis 36 and the main surface 32s in a direction perpendicular to the reference axis 36, and r represents a radius of the meta-lens 30. In addition, a dotted line indicating $y=r$ and a dotted line indicating $x=2\pi$ are illustrated in FIG. 5. In addition, in FIG. 5, only the four peaks 61 are denoted by reference numerals, and the reference numerals of the other peaks 61 are omitted for the sake of visibility. As illustrated in FIG. 5, the phase delay amount in the specific phase distribution 60 on the vertical plane including the reference axis 36 periodically repeats a change in which the phase delay amount decreases from a value extremely close to $2\pi$ and becomes 0 as it goes away from the reference axis 36 in the direction perpendicular to the reference axis 36. The width of this cycle becomes narrower with increasing distance from the reference axis 36, the maximum width is about 400 μm, and the width of the cycle adjacent to the cycle with the maximum width is about 100 μm. The minimum width is about 1 μm. As described above, the predetermined phase distribution 50 on any plane including the reference axis 36 is a curve similar to the predetermined phase distribution 50 illustrated in FIG. 4. For this reason, the phase delay amount in the specific phase distribution 60 on any plane including the reference axis 36 periodically repeats a change in which the phase delay amount decreases from a value infinitely close to $2\pi$ and becomes 0 as the distance from the reference axis 36 increases. Therefore, it can be understood that the phase delay amount in the specific phase distribution 60 periodically repeats the above change with distance from the reference axis 36. Here, as the number of cells arranged with respect to one cycle of the above change is smaller, the deviation between the phase distribution modulated by the meta region and the specific phase distribution 60 tends to be larger, and the ratio of the energy of the light emitted from the meta region at the divergence angle according to the specific phase distribution 60 with respect to the energy of the light incident on the meta region tends to be lower. In the present embodiment, when viewed along the reference axis 36, the plurality of cells 33 are arranged such that two or more cells 33 are positioned between the peaks 61 adjacent to each other in the direction away from the center of gravity 31g. That is, two or more cells 33 are arranged for one cycle of the above change. By arranging the cells 33 in this manner, the loss of light energy by the meta-lens 30 can be easily reduced to such an extent that it can be suitably used for a lens in a vehicular lamp. In the present embodiment, the shape of the nanostructure 35 is a columnar shape. Then, the inventor has found that the ratio of the energy of the light emitted from the meta region at the divergence angle according to the specific phase distribution 60 to the energy of the light incident on the meta region can be set to 60% or more by arranging three or more cells 33 for one cycle of the above change and forming the nanostructure 35 in a columnar shape. Therefore, from the viewpoint of reducing the loss of light energy in the meta-lens 30, such a configuration is preferable. In the present embodiment, the specific phase distribution 60 has three or more peaks 61. When viewed along the reference axis 36, the number of cells 33 located between the peaks 61 adjacent to each other in the direction away from the center of gravity 31g decreases as the distance from the center of gravity 31g increases.

In the vehicular lamp 1 of the present embodiment, the light L adjusted so that the divergence angle becomes small by the meta-lens 30 is emitted toward the front of the vehicle through the front cover 12. Therefore, in the vehicular lamp 1 of the present embodiment, it is easy to set the size of the light distribution pattern of the emitted light to a desired size. Furthermore, as described above, the light source unit 20 can change the light distribution pattern of the emitted light. Therefore, according to the vehicular lamp 1, for example, a high beam and a low beam can be switched and emitted, or an adaptive driving beam (ADB) can be emitted.

As described above, the vehicular lamp 1 of the present embodiment includes the light source unit 20 and the meta-lens 30. The meta-lens 30 has the main surface 31s as a meta region. On the main surface 31s, the plurality of cells 33 including the nanostructures 35 smaller than the longest wavelength of the light L emitted from the light source unit 20 are arranged, and the light L emitted from the light source unit 20 passes through the main surface 31s. The main surface 31s as the meta region changes the phase distribution of the light L passing through the main surface 31s. Here, in the projection lens in the vehicular lamp, generally, at least one of an incident surface and an emission surface is a curved surface, and a divergence angle of light emitted from a light source unit is adjusted by adjusting a shape of the curved surface. Therefore, in such a projection lens, a certain thickness is required to form the curved surface. Meanwhile, the meta-lens 30 in the vehicular lamp 1 of the present embodiment can change the phase distribution of the light L from the light source unit and adjust the divergence angle of the light L by adjusting the arrangement of the plurality of cells 33, the size of the nanostructure 35 in each cell 33, and the like. Therefore, in the meta-lens 30 of the present embodiment, even when a curvature of the main surface 31s as the meta region is made smaller than a curvature of the curved surface of the projection lens, and the main surface 31s is made planar, for example, the divergence angle of the light from the light source unit 20 can be adjusted and the light can be made thinner than the projection lens. Therefore, according to the vehicular lamp 1 of the present embodiment, the size can be reduced as compared with the case where the divergence angle of the light L from the light source unit 20 is adjusted by the projection lens.

Generally, by enlarging the lens, the amount of light emitted from the lens can be easily increased. In the present embodiment, the minimum width of the main surface 31s as the meta region is 10 mm or more. Therefore, in the present embodiment, the light distribution pattern of the light emitted from the meta-lens 30 can be easily set to the brightness required as the light distribution pattern of the light emitted from the vehicle headlight. Examples of the light distribution pattern of the light emitted from the vehicle headlight include light distribution patterns of a low beam and a high beam.

Second Embodiment

Next, a second embodiment of the present invention will be described in detail. Note that the same or equivalent components as those of the first embodiment are denoted by the same reference numerals, and redundant description will be omitted unless otherwise specified. The present embodiment is different from the first embodiment in the configuration of the meta-lens 30.

Figure 6:
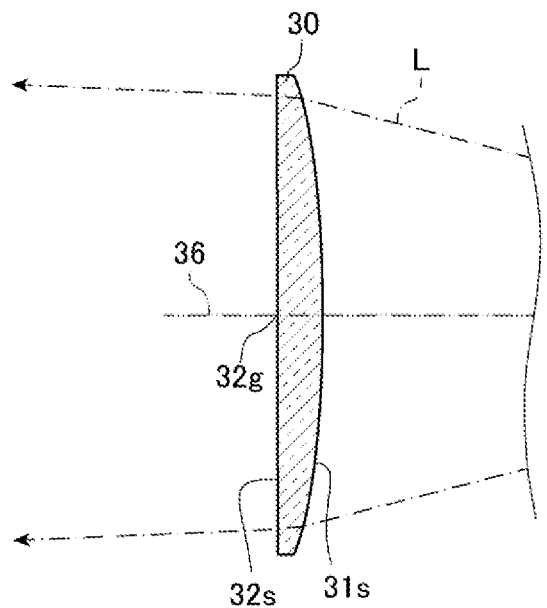
FIG. 6 is a cross-sectional view schematically illustrating a meta-lens according to a second embodiment.

FIG. 6 is a cross-sectional view schematically illustrating the meta-lens according to the present embodiment, and is a view schematically illustrating a cross section of the meta-lens in a thickness direction. As illustrated in FIG. 6, in the meta-lens 30 of the present embodiment, the entire main surface 31s as the incident surface on which the light L from the light source unit 20 is incident is a curved surface curved in a convex shape toward the outside. On the main surface 31s curved in this manner, the light L is refracted so that the divergence angle of the light L from the light source unit 20 decreases. Further, the entire main surface 32s as an emission surface from which the light L from the light source unit 20 is emitted is a meta region in which the plurality of cells 33 including the nanostructures 35 are arranged, and the light L from the light source unit 20 incident on the main surface 31s passes through the meta region. The reference axis 36 is orthogonal to the main surface 32s at the center of gravity 32g as a specific position on the main surface 32s, and intersects with the light source unit 20. Then, similarly to the first embodiment, the meta region is configured such that the phase distribution of the reference light emitted from the meta-lens 30 when the reference light parallel to the reference axis 36 is incident on the meta region becomes the specific phase distribution 60 obtained by dividing the predetermined phase distribution 50 by 2π. Note that the main surface 31s as the incident surface may be curved in a convex shape toward the outside to refract the light L so that the divergence angle of the light L from the light source unit 20 decreases, and a part thereof may be curved in a convex shape toward the outside.

Generally, when the divergence angle of light incident on the meta region increases, the design of the meta region tends to be complicated. In the meta-lens 30 of the present embodiment, the light L from the light source unit 20 is incident on the main surface 32s as the meta region after the divergence angle is reduced by the main surface 31s as the curved incident surface. Therefore, in the present embodiment, the divergence angle of the light L from the light source unit 20 incident on the meta region can be reduced as compared with the case where the main surface 31s is a flat surface. Therefore, according to the vehicular lamp 1 of the present embodiment, it is possible to suppress the complexity of the design of the meta region, and it is particularly useful when the divergence angle of the light L from the light source unit 20 is reduced as in the present embodiment.

Note that at least a part of the main surface 31s may be a meta region, the main surface 32s may be convexly curved outward, and the light L passing through the meta region may be emitted from the main surface 32s. In general, when the angle for adjusting the light divergence angle increases depending on the meta region, the design of the meta region tends to be complicated. According to such a configuration, as compared with the case where the main surface 32s is a flat surface, the angle for reducing the divergence angle of the light L by the meta region can be reduced, and the design of the meta region can be prevented from becoming complicated.

Third Embodiment

Next, a third embodiment of the present invention will be described in detail. Note that the same or equivalent components as those of the first embodiment are denoted by the same reference numerals, and redundant description will be omitted unless otherwise specified. The present embodiment is different from the first embodiment in the configuration of the meta-lens 30.

Figure 7:
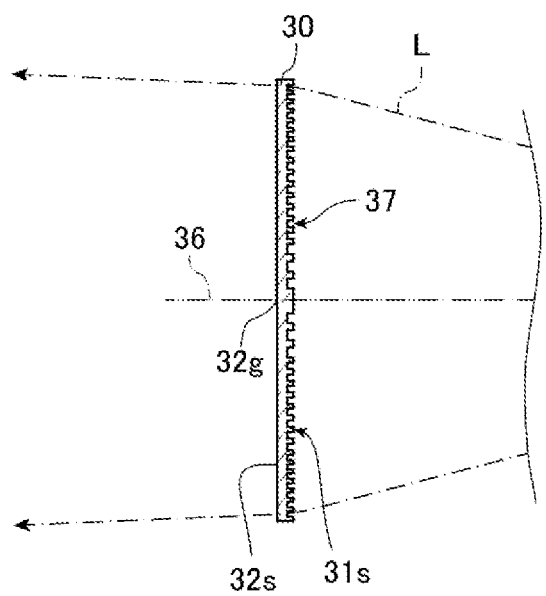
FIG. 7 is a cross-sectional view schematically illustrating a meta-lens according to a third embodiment.

FIG. 7 is a cross-sectional view schematically illustrating the meta-lens 30 according to the present embodiment, and is a view schematically illustrating a cross section of the meta-lens 30 in a thickness direction. As illustrated in FIG. 7, in the meta-lens 30 of the present embodiment, a plurality of grooves 37 are provided on the planar main surface 31s as the incident surface on which the light L from the light source unit 20 is incident. Note that, in FIG. 7, the groove 37 is exaggerated for the sake of visibility, and only one groove 37 is denoted by a reference sign, and the reference signs of the other grooves 37 are omitted. Each groove 37 extends along a circle centered on the center of gravity 31g, which is the center of the main surface 31s. In the main surface 31s provided with the plurality of grooves 37 as described above, the light L is diffracted so that the divergence angle of the light L from the light source unit 20 decreases. That is, it can be understood that the shape, depth, width, position, and the like of the groove 37 are adjusted so that the light L is diffracted in this manner, and the main surface 31s diffracts the light L in this manner. Further, the entire main surface 32s from which the light L from the light source unit 20 is emitted is a meta region in which the plurality of cells 33 including the nanostructures 35 are arranged, and the light L from the light source unit 20 passes through the meta region. The reference axis 36 is orthogonal to the main surface 32s at the center of gravity 32g as a specific position on the main surface 32s, and intersects with the light source unit 20. Similarly to the first exemplary embodiment, the meta region is configured such that the phase distribution of the reference light beam emitted from the meta-lens in the case that the reference light beam parallel to reference axis 36 is incident on the meta region becomes the specific phase distribution 60 obtained by dividing the predetermined phase distribution 50 by 2π. Note that the main surface 31s as the incident surface may be provided with a plurality of grooves 37 and diffract the light L so as to reduce the divergence angle of the light L from the light source unit 20, and the shape, number, position, and the like of the grooves 37 are not limited. The groove 37 may be provided on the curved main surface 31s.

Furthermore, in the meta-lens 30 of the present embodiment, the light L from the light source unit 20 is incident on the meta region after the divergence angle is reduced by the main surface 31s as the incident surface. Therefore, as compared with a case where the main surface 31s on which the light L from the light source unit 20 is incident is a flat surface, the angle for reducing the divergence angle of the light L incident on the main surface 31s by the meta region can be reduced. Therefore, according to the vehicular lamp 1 of the present embodiment, it is possible to suppress the complexity of the design of the meta region, and it is particularly useful when the divergence angle of the light L from the light source unit 20 is reduced as in the present embodiment.

From the viewpoint of suppressing the complexity of the design of the meta region, the plurality of grooves 37 may be provided in the main surface 31s in which the main surface 31s is curved in a convex shape toward the outside, and the main surface 31s may diffract the light L from the light source unit 20. Further, at least a part of the main surface 31s may be a meta region, and the main surface 32s may diffract the light L passing through the meta region such that the divergence angle becomes small. According to such a configuration, as compared with the case where the main surface 32s is a flat surface, the angle for reducing the divergence angle of the light L depending on the meta region can be reduced, and the design of the meta region can be prevented from becoming complicated.

Fourth Embodiment

Next, a fourth embodiment of the present invention will be described in detail. Note that the same or equivalent components as those of the first embodiment are denoted by the same reference numerals, and redundant description will be omitted unless otherwise specified.

Figure 8:
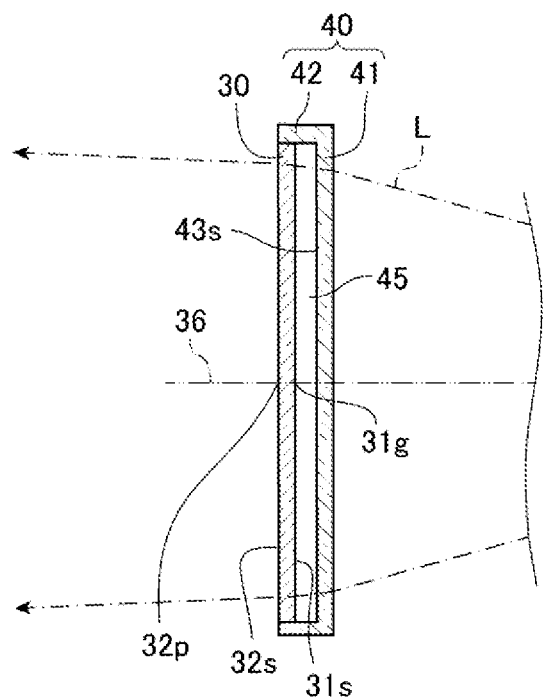
FIG. 8 is a view illustrating a vehicular lamp according to a fourth embodiment similarly to FIG. 1.

FIG. 8 is a diagram illustrating the vehicular lamp 1 according to the present embodiment similarly to FIG. 1. In FIG. 8, illustration of the housing 10 and the light source unit 20 is omitted. As illustrated in FIG. 8, the vehicular lamp 1 of the present embodiment is different from the vehicular lamp 1 of the first embodiment in further including a protective member 40 having light transmittance.

The protective member 40 of the present embodiment includes a main body portion 41 and a rib 42. The main body portion 41 is a disk-shaped member, and is disposed such that one main surface 43s faces the main surface 31s of the meta-lens 30 at a predetermined interval. In the direction parallel to the reference axis 36, the entire main surface 31s as the meta region overlaps the main body portion 41. The rib 42 is provided on the main surface 43s of the main body portion 41 and protrudes toward the meta-lens 30. The rib 42 extends over the entire circumference along an outer edge of the main body portion 41. The inner peripheral surface of the rib 42 is adhered to the outer peripheral surface of the meta-lens 30 over the entire circumference, and the protective member 40 is fixed to the meta-lens 30. Such a protective member 40 covers the main surface 31s as the meta region in a non-contact manner, and the main surface 31s exposed to a closed space 45 formed by the protective member 40 and the meta-lens 30. The main body portion 41 and the rib 42 are integrally formed, and examples of a material constituting the protective member 40 include glass, resin, and the like.

In the present embodiment, the light L emitted from the light source unit 20 passes through the main body portion 41 of the protective member 40 and enters the meta-lens 30, and the divergence angle of the light L is adjusted by the meta-lens 30, and the light L with the adjusted divergence angle is emitted toward the front of the vehicle via the front cover 12. In the present embodiment, as described above, the protective member 40 covers the main surface 31s as the meta region. Therefore, it is possible to suppress intrusion of dust or the like between the nanostructures 35, adhesion of dust or the like to the nanostructures 35, and damage to the nanostructures 35, and to appropriately adjust the divergence angle of the light L from the light source unit 20.

The rib 42 of the protective member 40 may be provided with a communication portion such as a hole for communicating the closed space 45 with the outside. However, from the viewpoint of suppressing intrusion of dust or the like between the nanostructures 35 and adhesion of dust or the like to the nanostructures 35, it is preferable that such a hole is not provided in the protective member 40.

Figure 9:
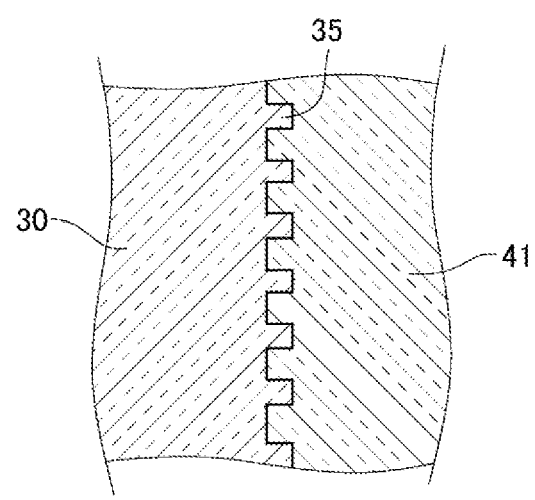
FIG. 9 is a cross-sectional view schematically illustrating a protective member and a meta-lens according to a first modification.

In addition, the protective member 40 may be in contact with the nanostructures 35, and for example, as illustrated in FIG. 9, the main body portion 41 of the protective member 40 may fill the space between the nanostructures 35. FIG. 9 is a cross-sectional view schematically illustrating the protective member 40 and the meta-lens 30 according to a first modification, and is a view schematically illustrating a part of a cross-section of the protective member 40 and the meta-lens 30 in a thickness direction. In addition, in FIG. 9, only one nanostructure 35 is denoted by a reference numeral, and the reference numerals of the other nanostructures 35 are omitted for the sake of visibility. In this case, the refractive index of the protective member 40 is lower than the refractive index of the meta-lens 30. Even with such a configuration, the divergence angle of the light L can be adjusted by the meta-lens 30.

Fifth Embodiment

Next, a fifth embodiment of the present invention will be described. Note that the same or equivalent components as those of the first embodiment are denoted by the same reference numerals and redundant description is omitted unless otherwise specified. The present embodiment is different from the first embodiment in the configuration of the meta-lens 30.

The arrangement of the plurality of cells 33 and the size, shape, and the like of the nanostructure 35 in each cell 33 are adjusted in the meta region in the meta-lens 30 of the present embodiment, and the phase distribution of the light L passing through the meta region is changed so that the coma aberration is generated. The coma aberration is an aberration in which a point image on an image plane is not formed at one point, but spreads and forms a comet-like tail. In the image plane, the light does not radially diffuse from the point image to the periphery of the point image but extends in a certain direction from the point image due to the coma aberration. As a result, it can be understood that the divergence angle of light is widened by coma aberration.

In the meta region of the present embodiment, the divergence angle of the light L passing through the meta region is widened by the coma aberration as compared with the case where the coma aberration is not generated. Due to the spread of the divergence angle of the light L, the light distribution pattern formed by the light L passing through the meta region is projected to the outside of the vehicular lamp 1 in a spread state as compared with the case where the coma aberration is not generated.

Figure 10:
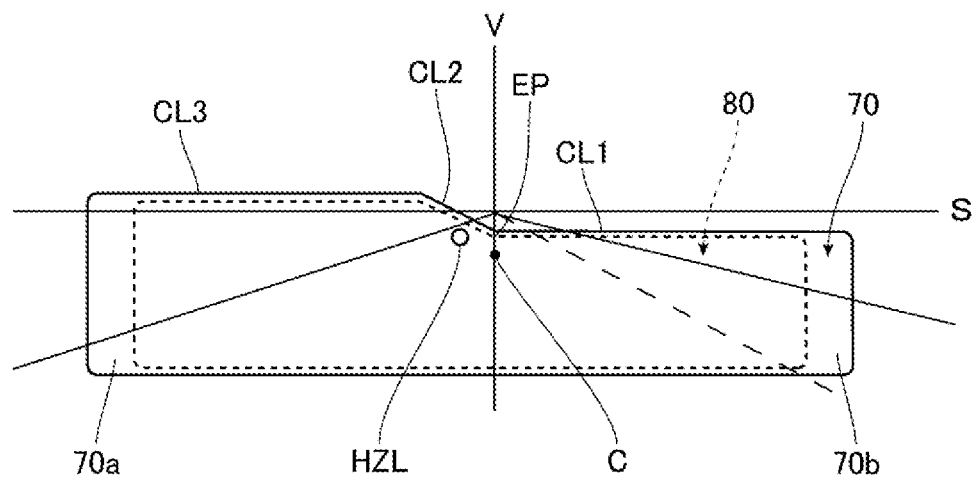
FIG. 10 is a diagram illustrating a light distribution pattern for a low beam formed on a virtual vertical screen arranged at a position 25 m ahead of a vehicular lamp in the fifth embodiment from the lamp.

FIG. 10 is a diagram illustrating a light distribution pattern for a low beam formed on a virtual vertical screen arranged at a position 25 m ahead of the right and left vehicular lamps 1 in the present embodiment. In FIG. 10, a light distribution pattern 70 projected from meta-lens 30 in which the coma aberration is generated is indicated by a solid line. In FIG. 10, a light distribution pattern 80 projected from the meta-lens in which the coma aberration is not generated is indicated by a broken line.

In FIG. 10, in order to clarify the light distribution patterns 70 and 80, an upper end and a lower end of the light distribution pattern 80 are illustrated inside an upper end and a lower end of the light distribution pattern 70, but the upper end and the lower end of the light distribution pattern 80 are located at the same positions as the upper end and the lower end of the light distribution pattern 70. The centers of the light distribution patterns 70 and 80 are assumed to be located at the same position.

In FIG. 10, S represents a horizontal line, C represents a reference axis that passes through the center of the light distribution pattern 70 in the right-left direction, is orthogonal to the light distribution pattern 70, and extends in the front-rear direction of the vehicle, and V represents a vertical line orthogonal to the reference axis C. The light distribution pattern 70 has cutoff lines CL1, CL2, and CL3 at the upper end. The cutoff line CL1 is provided on the side opposite to the cutoff line CL3 with reference to the cutoff line CL2. An intersection of the cutoff line CL1 and the cutoff line CL2 is referred to as an elbow point EP. The elbow point EP is located below the horizontal line S and on the vertical line V. The elbow point EP may be located below the horizontal line S and in the vicinity of the vertical line V. The cutoff line CL1 extends in the horizontal direction from the elbow point EP to the right side which is one side in the right-left direction of the vehicle. The cutoff line CL2 extends obliquely upward to the left in the up-down directions and the right-left directions of the vehicle from the elbow point EP. The end of the cutoff line CL2 on the side opposite to the elbow point EP side is located above the horizontal line S. The cutoff line CL3 extends in the horizontal direction from the above-described end of the cutoff line CL2 to the left side in the right-left direction of the vehicle. As the light amount distribution of the light distribution pattern 70, the light amount is the largest in a hot zone HZL located near the elbow point EP, and gradually decreases as the distance from the hot zone HZL increases.

In the meta region of the present embodiment, the phase distribution of the light L passing through the meta region is changed such that the coma aberration that extends the point image in the light distribution pattern 70 from the inside of the light distribution pattern 70 toward the outside of the light distribution pattern 70 in the right-left direction of the light distribution pattern 70 is generated. As a result, in the meta region of the present embodiment, the divergence angle of the light L is widened in the right-left direction of the light distribution pattern 70 formed by the light L by the coma aberration as compared with the case where the coma aberration is not generated, and the light distribution pattern 70 is widened in the right-left direction of the light distribution pattern 70 as compared with the light distribution pattern 80. In the light distribution pattern 70, a part of the light distribution pattern 70 between a V line and the left end of the light distribution pattern 70 is defined as a region 70*a*, and a remaining part of the light distribution pattern 70 between the V line and the right end of the light distribution pattern 70 is defined as a region 70*b*. In the meta region, when the meta-lens 30 is viewed from the vertical direction, the divergence angle of the light L forming the region 70*a* is widened in a left direction from the reference axis C of the light distribution pattern 70 by the coma aberration. In the meta region, when the meta-lens 30 is viewed from the vertical direction, the divergence angle of the light L forming the region 70*b* is widened in a right direction from the reference axis C of the light distribution pattern 70 by the coma aberration. As a result, the light distribution pattern 70 becomes a light distribution pattern in which the left end of the light distribution pattern 80 spreads to the left side which is the outer side in the region 70*a* and the right end of the light distribution pattern 80 spreads to the right side which is the outer side in the region 70*b*. In the meta region, the divergence angle of the light L forming the region 70*a* and spreading in the left direction and the divergence angle of the light L forming the region 70*b* and spreading in the right direction are the same. As a result, the spreading amounts of the right end and the left end of the light distribution pattern 70 can be the same, and the design of the meta-lens 30 can be facilitated as compared with the case where the spreading amounts are not the same.

As described above, in the meta region of this embodiment, the phase distribution of the light L passing through the meta region is changed such that the coma aberration is generated, and the divergence angle of the light L passing through the meta region is widened in the right-left direction of the light distribution pattern 70 as compared with the case where the coma aberration is not generated.

In the meta-lens 30, even when the coma aberration is not generated, the divergence angle of the light L can be widened by adjusting the arrangement of the plurality of cells 33 and the size, shape, and the like of the nanostructure 35 in each cell 33. However, in the meta region of the present embodiment, even when the divergence angle is the same as the divergence angle widened when the coma aberration is not generated, the divergence angle can be further widened in the right-left direction by the extension of the light L due to the coma aberration. Therefore, according to the vehicular lamp 1 of the present embodiment, the light distribution pattern 70 can be further widened in the right-left direction than the light distribution pattern projected from the meta-lens 30 in which the coma aberration is not generated and the divergence angle of the light L is widened.

In addition, in general, the projection lens as described above having a curved surface is designed to suppress the coma aberration. Therefore, in the case of using the projection lens, the spread of the divergence angle of the light from the light source unit is suppressed by the projection lens, and the spread of the light distribution pattern projected to the outside of the vehicular lamp is suppressed. Meanwhile, in the meta region of the meta-lens 30 configured as the projection lens of the present embodiment, since the divergence angle of the light L from the light source unit 20 is widened as described above by generating the coma aberration, the light distribution pattern 70 can be widened more than the light distribution pattern projected from the projection lens.

In addition, in the vehicular lamp of Patent Literature 2 described above, both a projection lens and an additional lens are used to widen the light distribution pattern. However, in the meta-lens 30 of the present embodiment, it is not necessary to adjust the relative position between the projection lens and the lens, the number of components can be reduced, and the weight of the vehicular lamp 1 can be reduced, as compared with the case where the light distribution pattern is widened by the projection lens and a lens different from the projection lens in this manner. In addition, as compared with the case where the divergence angle of the light is widened by the projection lens described above and the other lens described above, in the vehicular lamp 1 of the present embodiment, the divergence angle of the light L can be widened and downsized by one meta-lens 30.

In addition, the spreading amount of the light distribution pattern 70 is adjusted by the spreading amount of the divergence angle of the light L, the spreading amount of the divergence angle is adjusted by the above-described extension of the light L, which is the degree of coma aberration, and the extension of the light L is adjusted by the arrangement of the plurality of cells 33, the size and shape of the nanostructure 35 in each cell 33, and the like. Since the degree of freedom in designing the meta-lens 30 is increased as described above, in the vehicular lamp 1 of the present embodiment, the spreading amount of the light distribution pattern 70 can be easily controlled as compared with a projection lens in which the coma aberration is generated unintentionally due to processing accuracy.

Note that, even when coma aberration is intended to be generated in the projection lens, the degree of freedom of the spreading amount of the light distribution pattern is limited by the balance of the shape of the projection lens, the light amount distribution in the light distribution pattern projected by the projection lens, and the like. However, in the vehicular lamp 1 of the present embodiment, the degree of freedom of the spreading amount of the light distribution pattern 70 can be improved by adjusting the degree of coma aberration as compared with the projection lens that intentionally generates the coma aberration.

Even when the coma aberration is generated in the projection lens, the divergence angle of the light L does not necessarily spread in the direction away from the reference axis C of the light distribution pattern 70 in the right-left direction, and the light distribution pattern does not necessarily spread easily in the right-left direction. However, in the vehicular lamp 1 of the present embodiment, the light distribution pattern 70 can be easily spread in the right-left direction by adjusting the arrangement of the plurality of cells 33 and the size, shape, and the like of the nanostructure 35 in each cell 33. In addition, in the vehicular lamp 1 of the present embodiment, the meta-lens 30 can be easily produced as compared with the production of the projection lens in which the coma aberration is intentionally generated so that the light distribution pattern 70 spreads in the right-left direction.

Examples of aberration in which light diverges other than coma aberration used in the meta-lens 30 of the present embodiment include spherical aberration, astigmatism, and image plane aberration. In these three aberrations, light in the image plane may radially diffuse from a point image as a reference to the periphery of the point image. Therefore, in these three aberrations, as in coma aberration, image blurring spreads not only outside the light distribution pattern but also inside the light distribution pattern. Therefore, the light distribution pattern spread by any one of these three aberrations does not spread efficiently as compared with the light distribution pattern spread by coma aberration. Meanwhile, in the meta-lens 30 of the present embodiment, since the divergence angle of the light L is widened in the direction away from the reference axis C of the light distribution pattern 70 only in the right-left direction by the coma aberration, the light distribution pattern 70 is easily widened efficiently in the right-left direction as compared with the other three aberrations, and the widening direction can be defined in one direction. In addition, in the three aberrations, brightness blur may be generated at the left and right ends of the light distribution pattern due to the diffusion described above. Meanwhile, in the meta-lens 30 of the present embodiment, control is performed such that the direction in which the light distribution pattern spreads due to the coma aberration is outside the light distribution pattern in the right-left direction. Therefore, in the meta-lens 30 of the present embodiment, the amount of light can gradually decrease from the inside to the outside in the periphery of the left and right ends of the light distribution pattern, and blur in brightness at the left and right ends of the light distribution pattern can be suppressed as compared with the other three aberrations.

As described above, the light in the image plane extends in a certain direction from the point image due to the coma aberration, and the amount of extension of the light corresponds to the divergence angle from the point image in the image plane to the outermost angle of the comet-like divergent light spreading from the point image. The light amount of the light extended by the coma aberration is the largest in the point image, and gradually decreases as the distance from the point image increases. In the meta-lens 30 of the present embodiment, the light amount at the right and left ends of the spreading light distribution pattern 70 gradually decreases from the center side of the light distribution pattern 70 toward the outside, and the occurrence of the light distribution unevenness at the right and left ends of the light distribution pattern 70 can be suppressed. In addition, from the viewpoint of suppressing the light distribution unevenness in the light distribution pattern 70, the amount of elongation of light may be about 15% of the spread angle of light forming a point image on the image plane, and is very effective when the amount of elongation is 50% of the spread angle.

The light distribution pattern 70 has been described as a light distribution pattern for a low beam, but may be a light distribution pattern for a high beam.

In the meta region, the coma aberration is suppressed in the central portion of the light distribution pattern 70, and the divergence angle may be widened toward the end portion of the light distribution pattern 70. As a result, the spread of the field of view of the driver is secured while the light amount of the central portion is maintained. Furthermore, the meta region may widen one of the divergence angle of the light L that forms the region 70a and spreads in the left direction and the divergence angle of the light L that forms the region 70b and spreads in the right direction. As a result, only one of the right end and the left end of the light distribution pattern 70 can be widened. Furthermore, the meta region may form the region 70a and widen the divergence angle of at least a part of the light L spreading in the left direction. As a result, at least a part of the left end of the light distribution pattern 70 can spread. Furthermore, the meta region may form the region 70b and widen the divergence angle of at least a part of the light L spreading in the right direction. As a result, at least a part of the right end of the light distribution pattern 70 can be widened.

Although the fifth embodiment has been described as an example of the vehicular lamp 1 including the meta-lens 30 having the meta region that changes the phase distribution of the light L so as to generate the coma aberration, the vehicular lamp 1 is not limited thereto. A second modification, a third modification, and a fourth modification, which are modifications of such a vehicular lamp 1, will be described below.

Figure 11:
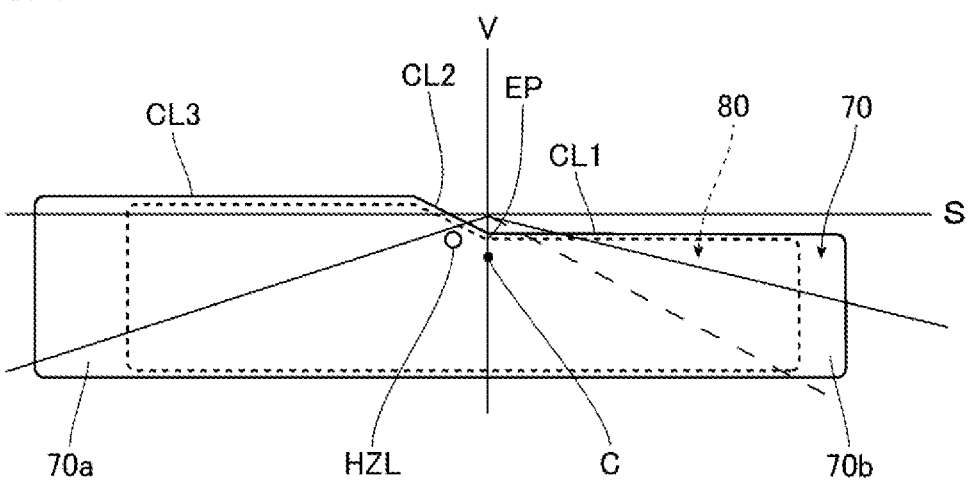
FIG. 11 is a view illustrating an example of a light distribution pattern in a second modification.
Figure 12:
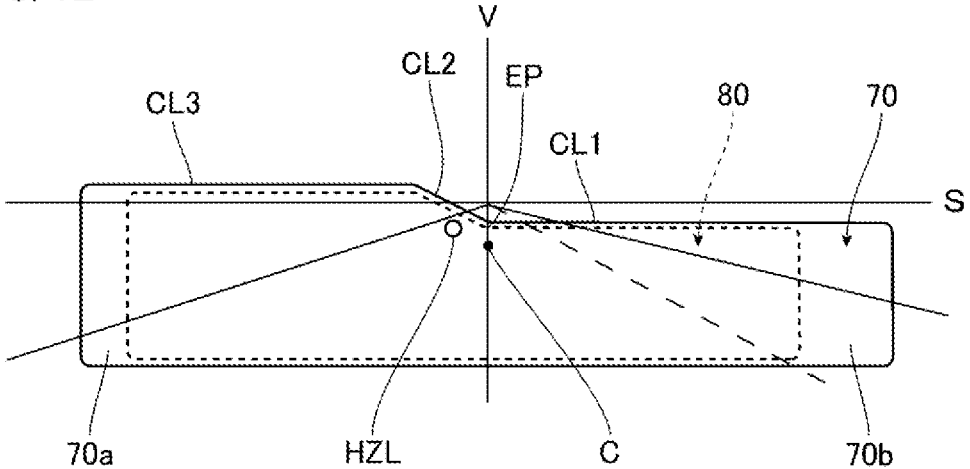
FIG. 12 is a view illustrating another example of the light distribution pattern in the second modification.

First, the second modification will be described with reference to FIGS. 11 and 12. FIG. 11 is a view illustrating an example of the light distribution pattern in the second modification, and FIG. 12 is a view illustrating another example of the light distribution pattern in the second modification. In the meta region of the present modification, one of the divergence angle of the light L that forms the region 70a and spreads in the left direction from the reference axis C of the light distribution pattern 70 and the divergence angle of the light L that forms the region 70b and spreads in the left direction from the reference axis C of the light distribution pattern 70 may be larger than the other. As a result, one of the spreading amount at the right end of the light distribution pattern 70 and the spreading amount at the left end of the light distribution pattern 70 becomes larger than the other. For example, when the meta region forms the region 70a, and the divergence angle of the light L spreading in the left direction from the reference axis C of the light distribution pattern 70 is made larger than the divergence angle of the light L which forms the region 70b and spreads in the right direction from the reference axis C of the light distribution pattern 70, the light distribution pattern 70 spreads wider to the left end than the right end as illustrated in FIG. 11. In this case, an irradiation range of the light L to an object such as a pedestrian or a road sign located on a sidewalk on a travel lane side can be widened. Furthermore, for example, when the meta region forms the region 70b, and the divergence angle of the light L spreading in the right direction from the reference axis C of the light distribution pattern 70 forms the region 70a and is made larger than the divergence angle of the light L spreading in the left direction from the reference axis C of the light distribution pattern 70, the light distribution pattern 70 spreads wider to the right end than the left end as illustrated in FIG. 12. In this case, the irradiation range of the light L to the object such as the pedestrian located on the sidewalk on the opposite lane side can be widened. Therefore, the driver of the vehicle can more easily visually recognize the object located on the side where the light distribution pattern spreads.

Figure 13:
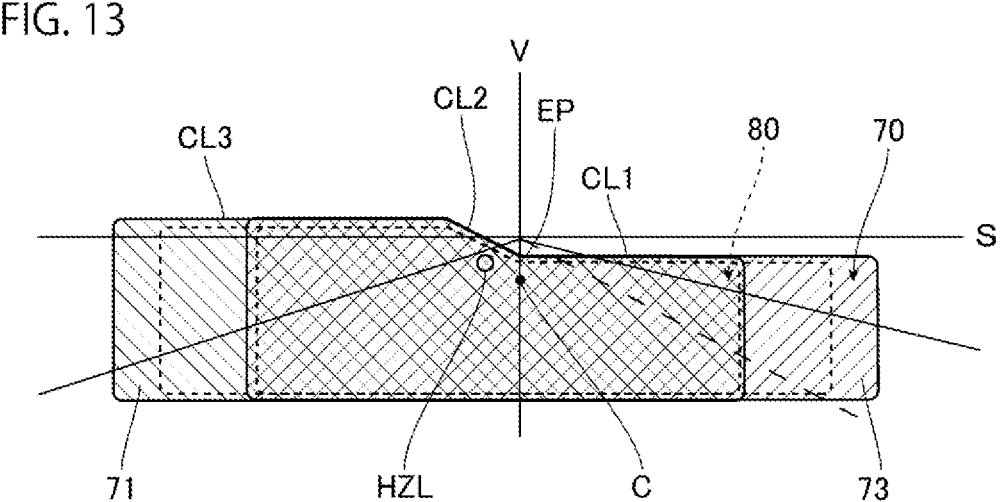
FIG. 13 is a view illustrating an example of a light distribution pattern in a third modification.

Next, a third modification will be described with reference to FIG. 13. FIG. 13 is a view illustrating an example of a light distribution pattern according to the third modification. The light distribution pattern 70 of the present modification is configured by overlapping of a light distribution pattern 71 projected from the left vehicular lamp 1 and a light distribution pattern 73 projected from the right vehicular lamp 1. In order to make the light distribution patterns 71 and 73 easy to see, the light distribution pattern 71 is hatched extending obliquely upward to the left, and the light distribution pattern 73 is hatched extending obliquely upward to the right. A left end of the light distribution pattern 71 is located outside a left end of the light distribution pattern 73. A right end of the light distribution pattern 73 is located outside a right end of the light distribution pattern 71.

Similarly to the light distribution pattern 70, the light distribution pattern 80 is formed by overlapping of the light distribution patterns projected from the left and right vehicular lamps 1. The light distribution pattern 80 is not hatched in order to be easily distinguished from the light distribution patterns 71 and 73.

The meta region of the left vehicular lamp 1 widens the divergence angle of the light L in the left direction from the optical axis that is a direction away from the reference axis C of the light distribution pattern 70 by the coma aberration. As a result, the left end of the light distribution pattern 71 spreads in the left direction from the left end of the light distribution pattern 80. In addition, the meta region of the right vehicular lamp 1 widens the divergence angle of the light L in the right direction from the optical axis which is a direction away from the reference axis C of the light distribution pattern 70 due to the coma aberration. As a result, the left end of the light distribution pattern 73 spreads in the right direction from the right end of the light distribution pattern 80.

As described above, even when the light distribution pattern 70 is formed by overlapping the light distribution patterns 71 and 73 projected from the left and right vehicular lamps 1, the light distribution pattern 70 can be widened to the left and right. Further, in the present modification, for example, the spread of the light distribution pattern in the left direction can be adjusted by replacing the left meta-lens 30 with another left meta-lens 30 having a different degree of coma aberration from the left meta-lens 30 before replacement.

Figure 14:
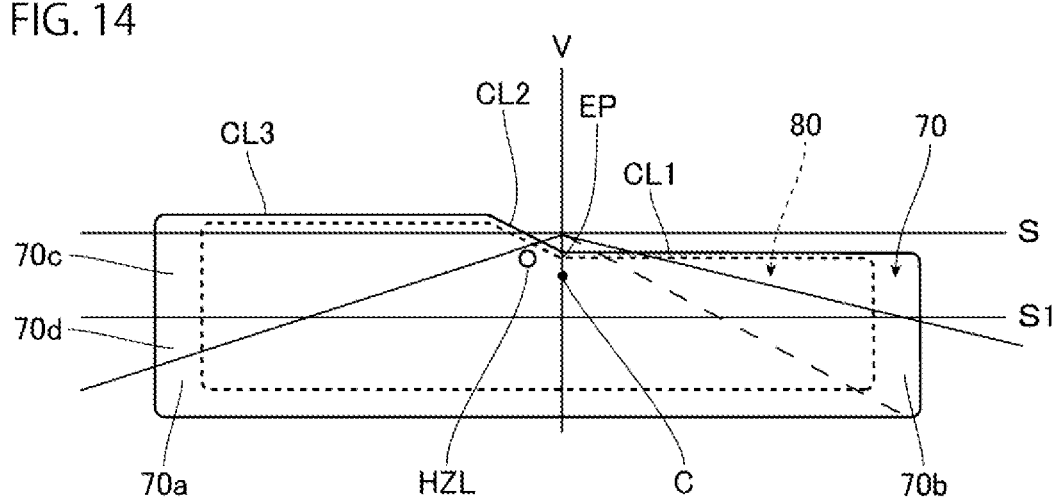
FIG. 14 is a view illustrating an example of a light distribution pattern in a fourth modification.

Next, a fourth modification will be described with reference to FIG. 14. FIG. 14 is a diagram illustrating an example of a light distribution pattern according to a fourth modification; In FIG. 14, S1 is a line parallel to the horizontal line S and passes through the center of the light distribution pattern 70. In the light distribution pattern 70, a part of the light distribution pattern 70 between the S1 line and the upper end of the light distribution pattern 70 is defined as a region 70c, and a remaining part of the light distribution pattern 70 between the S1 line and the lower end of the light distribution pattern is defined as a region 70d. The light distribution pattern 70 is for a low beam, and it is necessary to fix the position of the cut line. Therefore, when the meta-lens 30 is viewed from the horizontal direction, the meta region does not widen the divergence angle of the light L forming the region 70c in the upward direction from the optical axis that is the direction away from the reference axis C of the light distribution pattern 70 by the coma aberration, but widens the divergence angle of the light L forming the region 70d in the downward direction from the optical axis that is the direction away from the reference axis C of the light distribution pattern 70 by the coma aberration. As a result, the light distribution pattern 70 becomes a light distribution pattern in which the lower end of the light distribution pattern 80 spreads downward to the outside in the region 70d. Note that, for example, in a case where the light distribution pattern 70 is a light distribution pattern for a high beam, the meta region may widen the divergence angle of the light L forming the region 70c in the upward direction from the optical axis, which is a direction away from the reference axis C of the light distribution pattern 70, by coma aberration when the meta-lens 30 is viewed from the horizontal direction. As a result, the light distribution pattern 70 becomes a light distribution pattern in which the upper end of the light distribution pattern 80 spreads upward to be the outer side in the region 70c. As described above, in the meta region, the phase distribution of the light L passing through the meta region is changed such that the coma aberration that extends the point image in the light distribution pattern 70 from the inside of the light distribution pattern 70 toward the outside of the light distribution pattern 70 in the up-down direction of the light distribution pattern 70 is generated. As a result, in the meta region, the divergence angle of the light L is widened in the direction away from the reference axis C of the light distribution pattern 70 in the up-down direction of the light distribution pattern as compared with the case where the coma aberration is not generated, and the light distribution pattern 70 is also widened in the up-down direction which is the height direction of the light distribution pattern as compared with the light distribution pattern 80. In this case, the driver of the vehicle can easily visually recognize an object such as a guide sign or a road surface.

In the meta region, the divergence angle of the light L forming an end side of the light distribution pattern 70 in the right-left direction and spreading in the right-left direction from the reference axis C of the light distribution pattern 70 is wider than the divergence angle of the light L forming an end side of the light distribution pattern 70 in the up-down direction and spreading in the up-down direction from the reference axis C of the light distribution pattern 70. As a result, the spreading amount at each of the left and right ends of the light distribution pattern 70 is larger than the spreading amount at the lower end of the light distribution pattern 70, and the light distribution pattern 70 spreads more in the right-left direction than in the up-down direction of the light distribution pattern 70 without changing the amount of light emitted from the meta-lens 30. As a result, the spread of the field of view of the driver can be ensured in the right-left direction rather than the up-down direction by the light distribution pattern. In addition, the driver of the vehicle can more easily visually recognize a pedestrian and an object such as a road sign than in a case where the spreading amount of each of the left and right ends of the light distribution pattern 70 is not larger than the spreading amount of the lower end of the light distribution pattern 70.

In the meta region, the divergence angle of the light L forming the lower end side of the light distribution pattern 70 may not be widened, or the divergence angle of the light L forming the upper end side of the light distribution pattern 70 may be widened. Alternatively, in the meta region, the divergence angle of the light L forming the end side of the light distribution pattern 70 in the up-down direction may be wider than the divergence angle of the light L forming the end side of the light distribution pattern 70 in the right-left direction. As a result, the light distribution pattern 70 spreads more in the up-down direction than in the right-left direction of the light distribution pattern 70.

Sixth Embodiment

Next, a sixth embodiment of the present invention will be described. Note that the same or equivalent components as those of the first embodiment are denoted by the same reference numerals and redundant description is omitted unless otherwise specified. The present embodiment is different from the first embodiment in the configuration of the meta-lens 30.

As illustrated in FIG. 1, for example, in a case where a vehicle travels on an uphill during the day, light such as sunlight may enter the housing 10 of the vehicular lamp 1 from the outside of the vehicular lamp 1 through the front cover 12. The light incident on the inside of the housing 10 may be incident on the main surface 32s in the meta-lens 30, be emitted from the main surface 31s toward the light source unit 20, travel in a direction opposite to the light L from the light source unit 20, and be condensed on the light source unit 20. The light source unit 20 may be deteriorated by condensing light. In the meta region of the present embodiment, the light collection is suppressed by the bending force, and the bending force will be described below. In the following description, it is assumed that the longest wavelength of visible light contained in light is 660 nm, the shortest wavelength of infrared light contained in light is 1000 nm, and the ratio of the wavelengths of the respective light in this case is 1:1.5.

The bending force indicates a force with which the refractive lens and the meta region bend light passing therethrough. The smaller the bending force, the smaller the bending angle of the light passing through each of the bending forces, and the convergence of the light is suppressed.

Next, the bending force of one refractive lens will be described. A main material of the refractive lens is acryl or polycarbonate. The refractive index of the refractive lens made of acrylic is 1.489 for visible light and 1.483 for infrared light. The refractive index of the refractive lens made of polycarbonate is 1.579 for visible light and 1.568 for infrared light.

Since the focal length of one refractive lens is inversely proportional to the "refractive index-1", the bending force of the refractive lens is proportional to the "refractive index-1". Therefore, in the refractive lens made of acrylic, when the bending force of the refractive lens that bends visible light is 1, the bending force of the refractive lens that bends infrared light is approximately 0.98. In addition, in the refractive lens made of polycarbonate, when the bending force of the refractive lens that bends visible light is 1, the bending force of the refractive lens that bends infrared light is approximately 0.98.

Therefore, the bending force of the refractive lens that bends infrared light is approximately 0.98 times the bending force of the refractive lens that bends visible light regardless of whether the refractive lens is acrylic or polycarbonate. In this case, since the bending force of the refractive lens that bends the infrared light is substantially the same as the bending force of the refractive lens that bends the visible light, the bending angle of the infrared light is substantially the same as the bending angle of the visible light, and the focal length of the refractive lens that bends the infrared light is substantially the same as the focal length in the case of the visible light. Therefore, the refractive lens easily condenses infrared light.

Next, the bending force of the meta region will be described. The phase distribution of the light passing through the meta region is changed by the meta region as described above. Since the phase represents a leading delay of the wave surface of the light, the light to which the phase distribution is given has an inclination in the wave surface. Since the light travels in a direction perpendicular to the wave surface, the wave surface of the light whose phase has been modulated in the meta region due to the above effect is inclined in a direction different from the original traveling direction, and the traveling direction of the light is bent. Therefore, the bending force of the meta region that bends the light passing through the meta region is substantially proportional to the value of the product of the phase modulation amount of the light and the wavelength of the light. As described above, the meta region changes the phase distribution of the light passing through the meta region. This phase distribution changes according to the arrangement of the plurality of cells 33, the size and shape of the nanostructure 35 in each cell 33, and the like. By these adjustments, the meta region changes the phase distribution of the light passing through the meta region. In the meta region, the phase modulation amount of the light is changed by the change. In the meta region of this embodiment, the ratio between the phase modulation amount of the visible light and the phase modulation amount of the infrared light is set to 4:1 by the above-described adjustment, and the ratio between the above-described longest wavelength of the visible light and the above-described shortest wavelength of the infrared light is 1:1.5. Therefore, in this case, the ratio between the bending force of the meta region that bends the visible light and the bending force of the meta region that bends the infrared light is 1:0.3.

As described above, in the meta region, the phase distribution of the light passing through the meta region is changed by the adjustment, the phase modulation amount of the light is changed by the change, and the bending force of the meta region that bends the infrared light passing through the meta region is made smaller than the bending force of the meta region that bends the visible light passing through the meta region by the change. When the bending force of the meta region that bends the infrared light becomes smaller than the bending force of the meta region that bends the visible light, the bending angle of the infrared light becomes smaller than the bending angle of the visible light, and thus, the condensing of the infrared light can be suppressed in the meta region. Therefore, in the meta region, the visible light is condensed on the light source unit 20, and the condensing of the infrared light is suppressed to transmit the infrared light.

Next, a comparison between the bending force of the meta region that bends the infrared light and the bending force of the refractive lens that bends the infrared light will be described. When both are compared with each bending force for bending the visible light, the bending force of the meta region for bending the infrared light is smaller than the bending force of the refractive lens for bending the infrared light by the above adjustment. Therefore, the bending angle of the infrared light by the meta region is smaller than the bending angle of the infrared light by the refractive lens. Assuming that the focal length of the refractive lens that bends the visible light is 50 mm, the focal length of the refractive lens that bends the infrared light is shifted by approximately 0.1 mm from the focal length that bends the visible light by the above-described bending force ratio of the refractive lens. Meanwhile, when the focal length of the meta-lens 30 including the meta region in which the visible light is bent is assumed to be 50 mm similarly to the above, the focal length of the meta-lens 30 including the meta region in which the infrared light is bent is shifted by approximately 100 mm from the focal length of the meta-lens 30 including the meta region in which the visible light is bent by the ratio of the bending force of the meta region. Therefore, when the bending force for bending the infrared light is made smaller in the meta region than in the refractive lens, the bending angle of the infrared light by the meta region becomes smaller than the bending angle of the infrared light by the refractive lens, and thus, the condensing of the infrared light can be suppressed in the meta region as compared with the refractive lens.

Note that even when the focal length of the meta-lens 30 with respect to the infrared light is shifted from the focal length of the meta-lens 30 with respect to the visible light by about 10% of the focal length, the meta region can suppress the condensing of the infrared light. In this case, the ratio of the bending force of the meta region that bends the visible light to the bending force of the meta region that bends the infrared light is approximately 1:0.9, that is, the bending force of the meta region that bends the infrared light is approximately 0.9 times the bending force of the meta region that bends the visible light. Hereinafter, the ratio between the phase modulation amount of visible light and the phase modulation amount of infrared light in a case where the ratio between the bending force of the meta region that bends the visible light and the bending force of the meta region that bends the infrared light is approximately 1:0.9 will be described.

Here, the ratio between the phase modulation amount of visible light and the phase modulation amount of infrared light is 1:X. The ratio of the wavelengths of visible light and infrared light is 1:1.5 as described above. In addition, the ratio between the bending force of the meta region that bends the visible light and the bending force of the meta region that bends the infrared light is appropriately about 1:0.9 described above. As described above, the bending force of the meta region that bends each of the visible light and the infrared light is substantially proportional to the value of the product of the phase modulation amount and the wavelength. Therefore, X is 0.6, and the phase modulation amount of the infrared light is 0.6 times the phase modulation amount of the visible light. Note that, since the bending force of the meta region that bends the infrared light is preferably less than 0.9 times the bending force of the meta region that bends the visible light, the phase modulation amount of the infrared light is preferably less than 0.6 times the phase modulation amount of the visible light.

As described above, the bending force of the refractive lens that bends the infrared light is approximately 0.98 times the bending force of the refractive lens that bends the visible light, and the bending force of the meta region that bends the infrared light is less than 0.9 times the bending force of the meta region that bends the visible light. When the bending force of the meta region that bends the infrared light and the bending force of the refractive lens that bends the infrared light are compared with each bending force that bends the visible light, the bending force of the meta region that bends the infrared light is smaller than the bending force of the refractive lens that bends the infrared light. Therefore, the meta region can suppress the condensing of the infrared light more than the refractive lens.

Figure 15:
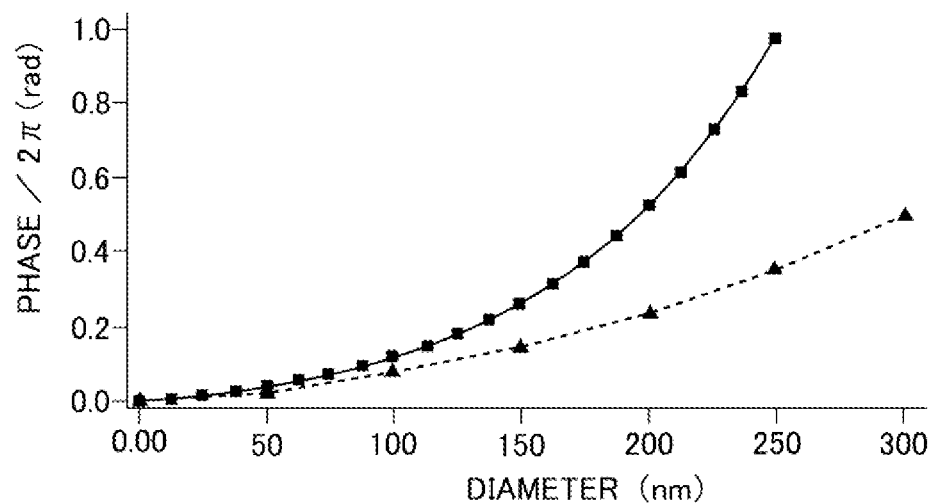
FIG. 15 is a diagram illustrating a relationship between a diameter of a nanostructure and a phase modulation amount of each of visible light having a longest wavelength of 660 nm and infrared light having a shortest wavelength of 1000 nm in a sixth embodiment.

FIG. 15 is a diagram illustrating a relationship between the diameter of the nanostructure 35 and the phase modulation amount of each of visible light having a longest wavelength of 660 nm and infrared light having a shortest wavelength of 1000 nm. A solid line indicates the relationship between the diameter of the nanostructure 35 and the phase modulation amount of visible light, and a broken line indicates the relationship between the diameter of the nanostructure 35 and the phase modulation amount of infrared light.

It is important that the phase modulation amount of the visible light is in the range of 0-2 $\pi$ (rad) in order to collect the visible light by the function of the meta-lens 30 as a lens with respect to the visible light. For this reason, it is sufficient that the shape of the nanostructure 35 is a columnar shape, and the diameter range of the columnar nanostructure 35 is a diameter corresponding to this range, and for example, it is preferable that the diameter range is from 0 nm to 250 nm. In the present embodiment, it is more preferable that the diameter range of the nanostructure 35 is, for example, 100 nm to 250 nm, and a plurality of nanostructures 35 having diameters within this range are arranged. In the range of the phase modulation amount of visible light, the phase modulation amount of infrared light is 0.5 $\pi$ radians. Therefore, the meta region suppresses the condensing of the infrared light and transmits the infrared light.

Note that, in a case where the shape of the nanostructure 35 is a columnar shape, the inclination of the graph illustrated in FIG. 15 becomes smaller as the wavelength of light to be condensed becomes longer, and thus the range of the diameter of the nanostructure 35 is widened.

As described above, in the meta region of this embodiment, the phase distribution of the light passing through the meta region is changed, and the bending force of the meta region that bends the infrared light included in the light passing through the meta region is made smaller than the bending force of the meta region that bends the visible light included in the light passing through the meta region.

In the vehicular lamp 1 of the present embodiment, as described above, the meta region changes the phase distribution of the light passing through the meta region. This phase distribution changes according to the arrangement of the plurality of cells 33, the size and shape of the nanostructure 35 in each cell 33, and the like. Therefore, in the meta region, by adjusting these, the phase distribution of the light passing through the meta region is changed, and the bending force of the meta region that bends the infrared light included in the light is made smaller than the bending force of the meta region that bends the visible light included in the light. The smaller the bending force, the smaller the bending angle of the light passing through the meta region, and the light focusing is suppressed. Therefore, for example, even when sunlight enters the inside of the housing 10 of the vehicular lamp 1 from the outside of the vehicular lamp 1 via the front cover 12, in the vehicular lamp 1, the bending angle of the infrared light included in the sunlight is smaller than the bending angle of the visible light of the sunlight due to the above-described bending force, so that the condensing of the infrared light traveling to the light source unit 20 can be suppressed in the meta region as compared with the projection lens. When the condensing of the infrared light is suppressed, deterioration of the light source unit 20 due to the condensing of the infrared light can be suppressed as compared with the projection lens.

Furthermore, when the deterioration of the light source unit 20 is suppressed, the influence of the deterioration of the light source unit 20 on the light L emitted from the light source unit 20 is suppressed, and a predetermined light distribution pattern can be projected.

In addition, since the nanostructure 35 has a columnar shape, even when the visible light from the light source unit 20 is randomly polarized light, the visible light can be efficiently bent.

The vehicular lamp 1 including the meta-lens 30 having the meta region in which the bending force for bending the infrared light is smaller than the bending force for bending the visible light has been described by taking the sixth embodiment as an example, but such a vehicular lamp 1 is not limited thereto. A modification of the sixth embodiment will be described below.

In the vehicular lamp 1 of the sixth embodiment, sunlight has been described as light that enters the inside of the vehicular lamp 1 from the outside of the vehicular lamp 1. However, the light is not limited to sunlight, and may be infrared light and visible light that enter the inside of the vehicular lamp 1 from the outside of the vehicular lamp 1. As an example of the wavelength ratio of 1:1.5, the longest wavelength of visible light is set to 660 nm, and the shortest wavelength of infrared light is set to 1000 nm. However, as long as the wavelength ratio is 1:1.5, the wavelengths of visible light and infrared light are not particularly limited.

The light distribution pattern projected from the vehicular lamp 1 may be a light distribution pattern for a low beam or a light distribution pattern for a high beam.

Seventh Embodiment

Next, a seventh embodiment of the present invention will be described. Note that the same or equivalent components as those of the first embodiment are denoted by the same reference numerals and redundant description is omitted unless otherwise specified. The present embodiment is different from the first embodiment in the configurations of the light source unit 20 and the meta-lens 30.

Figure 16:
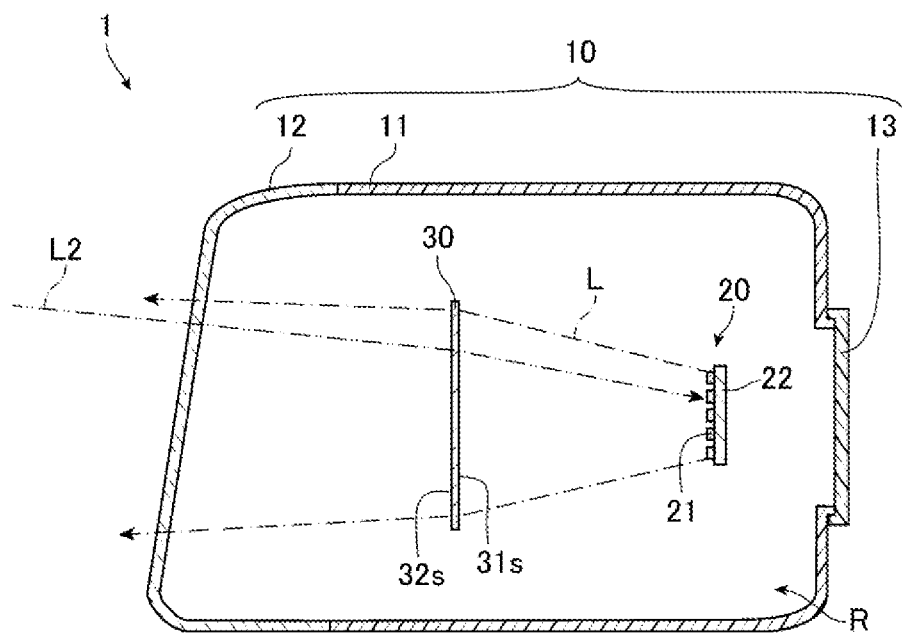
FIG. 16 is a diagram illustrating a vehicular lamp according to a seventh embodiment similarly to FIG. 1.
Figure 17:
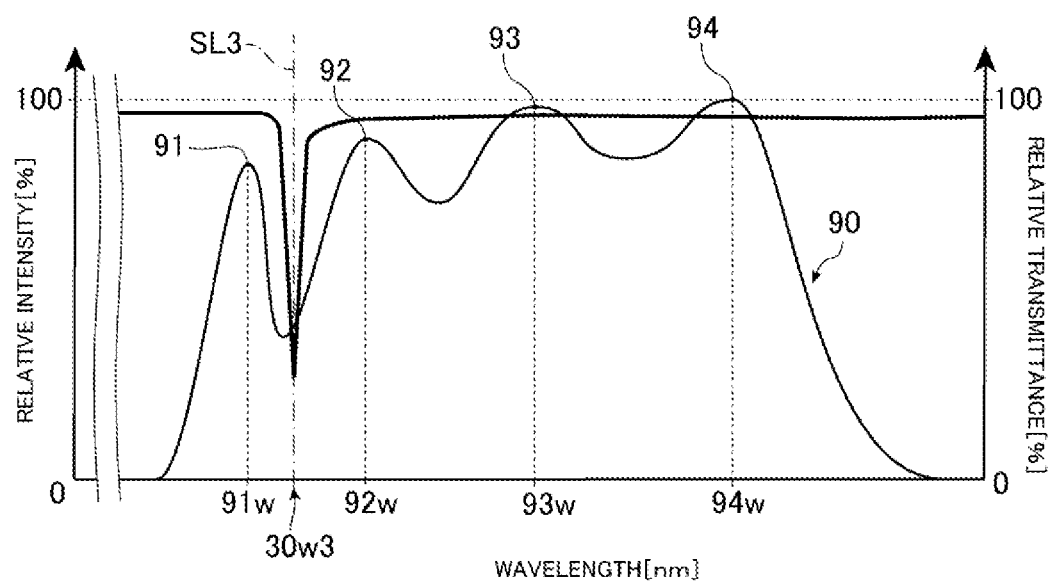
FIG. 17 is a diagram schematically illustrating a spectral distribution of light emitted from a light source unit and a transmittance distribution of light of a meta-lens in the seventh embodiment.

FIG. 16 is a diagram illustrating the vehicular lamp according to the present embodiment similarly to FIG. 1. Furthermore, FIG. 17 is a diagram schematically illustrating a spectral distribution of light emitted from the light source unit 20 and a transmittance distribution of light of the meta-lens 30 in the present embodiment. In FIG. 17, a horizontal axis represents a wavelength, a first vertical axis represents a relative intensity based on a maximum intensity, and a second vertical axis represents a relative transmittance based on a maximum transmittance. In FIG. 17, the spectral distribution is indicated by a thin line, and the transmittance distribution is indicated by a thick line. In the present embodiment, the wavelength band of the light L emitted from the light source unit 20 is approximately 380 nm to 780 nm. As illustrated in FIG. 17, the spectral distribution 90 of the light L has four peaks 91, 92, 93, and 94. Wavelengths 91w, 92w, 93w, and 94w at the peaks 91, 92, 93, and 94 are longer in the order of the wavelength 91w, the wavelength 92w, the wavelength 93w, and the wavelength 94w. The wavelength 91w is approximately 410 nm, the wavelength 92w is approximately 460 nm, the wavelength 93w is approximately 530 nm, and the wavelength 94w is approximately 620 nm. Therefore, among the wavelengths 91w, 92w, 93w, and 94w at the plurality of peaks 91, 92, 93, and 94, the wavelength 91w is the shortest and the wavelength 94w is the longest. The wavelengths 91w, 92w, 93w, and 94w at the peaks 91, 92, 93, and 94 are included in a wavelength band of visible light. Note that the spectral distribution 90 may have a peak that is not included in the wavelength band of visible light. In addition, the number of peaks of the spectral distribution 90 is not limited, and for example, the spectral distribution 90 may not have a peak. In addition, since the light L emitted from the light source unit 20 is light emitted from the plurality of light emitting elements 21, the spectral distribution of the light emitted from each light emitting element 21 is substantially the same as the spectral distribution 90 illustrated in FIG. 17.

For example, when the vehicle travels on an upward slope during the day, as illustrated in FIG. 16, there is a case where sunlight L2 enters the lamp chamber R through the front cover 12, passes through the meta-lens 30, and is emitted to the light source unit 20. In the present embodiment, the meta-lens 30 reduces the divergence angle of the light L passing through the meta-lens 30 from the light source unit 20. Therefore, the sunlight L2 passing through the meta-lens 30 is condensed and applied to the light source unit 20.

Figure 18:
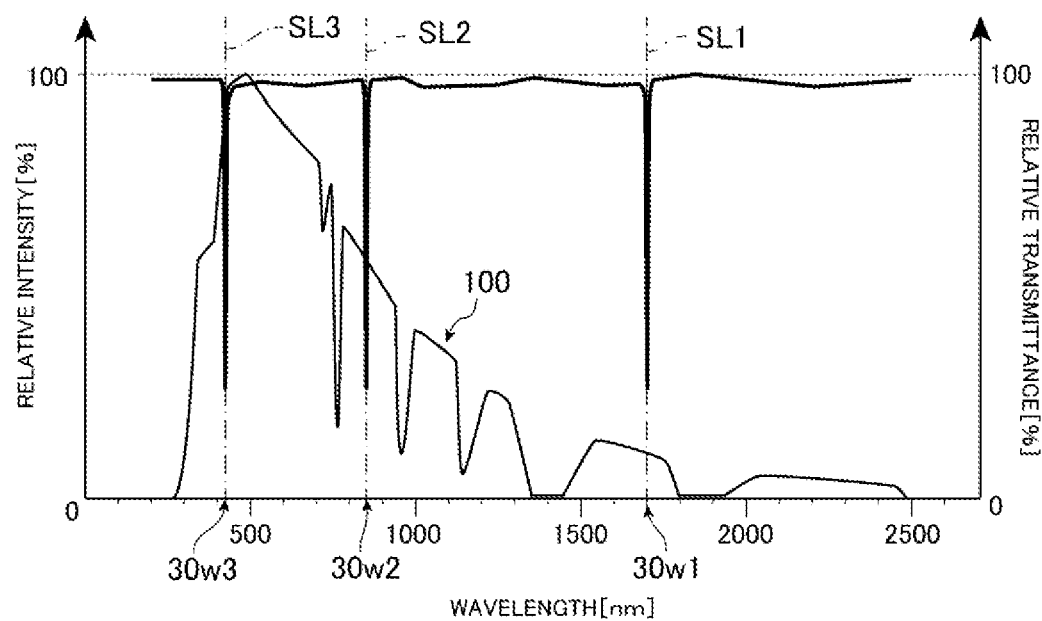
FIG. 18 is a diagram schematically illustrating a spectral distribution of sunlight near the ground surface and a transmittance distribution of light of the meta-lens of the seventh embodiment.

FIG. 18 is a diagram schematically illustrating a spectral distribution of the sunlight L2 near the ground and the light transmittance distribution of the meta-lens 30 of the present embodiment. In FIG. 18, a horizontal axis represents the wavelength, a vertical axis represents the relative intensity based on the maximum intensity, and a second vertical axis represents the relative transmittance based on the maximum transmittance. In FIG. 18, the spectral distribution is indicated by a thin line, and the transmittance distribution in the range of 300 nm to 2500 nm is indicated by a thick line. As illustrated in FIG. 18, the sunlight L2 includes visible light and infrared light.

In addition, in the meta-lens having the meta region in which the cells including the nanostructures are arranged, a phenomenon may occur in which the transmittance of light having a specific wavelength is extremely lower than the transmittance of light having other wavelengths, and it is known that there are a plurality of specific wavelengths. These specific wavelengths are wavelengths at which opacity of the light in the meta-lens peaks, and are called resonance wavelengths. These resonance wavelengths are determined according to the size and shape of the nanostructure in each cell, the refractive index of the material constituting the nanostructure, and the like. In the present embodiment, as illustrated in FIG. 18, among the plurality of resonance wavelengths in the meta-lens 30, a longest resonance wavelength 30$w$1 and a second longest resonance wavelength 30$w$2 are included in a range of 800 nm or more and less than 2400 nm, and the second longest resonance wavelength 30$w$2 is included in a range of 800 nm or more and less than 900 nm. Specifically, the resonance wavelength 30$w$1 is approximately 1700 nm, and the resonance wavelength 30$w$2 is approximately 850 nm. A third longest resonance wavelength 30$w$3 is approximately 425 nm. In FIG. 18, alternate long and short dash lines SL1, SL2, and SL3 indicating the resonance wavelengths 30$w$1, 30$w$2, and 30$w$3 are illustrated. In FIG. 17, the alternate long and short dash line SL3 indicating the resonance wavelength 30$w$3 is illustrated. As illustrated in FIG. 17, the resonance wavelength 30$w$3 is included in the wavelength band of the light L emitted from the light source unit 20, and the light L from the light source unit 20 includes light having the same wavelength as the resonance wavelength 30$w$3. However, the resonance wavelength 30$w$3 is different from the wavelengths 91$w$, 92$w$, 93$w$, and 94$w$ of the peaks 91, 92, 93, and 94 in the spectral distribution 90 of the light L. Therefore, all of the plurality of resonance wavelengths in meta-lens 30 are different from the wavelengths of these peaks. The resonance wavelength 30$w$3 is a wavelength between the wavelengths 91$w$ and 92$w$ of the adjacent peaks 91 and 92. At least one resonance wavelength in the meta-lens 30 may be 800 nm or more and less than 2400 nm. For example, the longest resonance wavelength may be the resonance wavelength 30$w$2, and the second longest resonance wavelength may be the resonance wavelength 30$w$3.

As described above, in the vehicular lamp 1 of the present embodiment, at least one resonance wavelength in the meta-lens 30 is 800 nm or more and less than 2400 nm. As illustrated in FIG. 18, generally, sunlight near the ground includes light in a wavelength band of 800 nm to 2400 nm. Therefore, according to the vehicular lamp 1 of the present embodiment, when the sunlight L2 passes through the meta-lens 30 and emitted to the light source unit 20, the irradiation amount of the light having the wavelength of 800 nm to 2400 nm of the sunlight L2 to the light source unit 20 can be reduced as compared with the case where the meta-lens 30 is used as the projection lens. Therefore, according to the vehicular lamp 1 of the present embodiment, as compared with the above case, the amount of heating of the light source unit 20 by the sunlight L2 can be reduced, and deterioration of the light source unit 20 by the sunlight L2 can be suppressed.

In the vehicular lamp 1 of the present embodiment, the resonance wavelength 30$w$2 is included in the range of 800 nm or more and less than 900 nm. As illustrated in FIG. 18, in general, the intensity of sunlight L2 near the ground tends to decrease as the wavelength becomes longer in a wavelength band of 800 nm or more. Note that the spectral distribution 100 of the sunlight L2 has a plurality of valleys in which the intensity rapidly decreases. The minimum intensity at this valley is, for example, 50% or less of the intensity in the vicinity of the valley. Such a valley tends not to be located in the range of 800 nm or more and less than 900 nm. Therefore, with the above configuration, it is easy to reduce the amount of heating of the light source unit 20 by the sunlight L2 when the sunlight L2 passes through the meta-lens 30 and emitted to the light source unit 20. Note that a plurality of resonance wavelengths may be included in the range of 800 nm or more and less than 900 nm, and the resonance wavelengths may not be included in this range.

In the vehicular lamp 1 of the present embodiment, the spectral distribution 90 of the light L emitted from the light source unit 20 has the four peaks 91, 92, 93, and 94. The plurality of resonance wavelengths are different from the wavelengths 91$w$, 92$w$, 93$w$, and 94$w$ of the peaks 91, 92, 93, and 94. The light having the wavelength at the peaks 91, 92, 93, and 94 of the spectral distribution 90 tends to greatly affect the color tone of the light emitted from the vehicular lamp. Therefore, according to the vehicular lamp 1 of the present embodiment, it is possible to suppress a decrease in the transmittance of the light having a wavelength that greatly affects the color tone of the emitted light at the meta-lens 30, and to emit light of a desired color tone.

From the viewpoint of emitting light of a desired color tone, the spectral distribution 90 may have a plurality of peaks, and the plurality of resonance wavelengths may be different from the respective wavelengths of the plurality of peaks. For example, a plurality of resonance wavelengths may be included in the wavelength band of the light L emitted from the light source unit 20. In the present embodiment, the resonance wavelength 30$w$3 included in the wavelength band of the light L from the light source unit is a wavelength between the wavelengths 91$w$ and 92$w$ of the peaks 91 and 92 adjacent to each other. In such a case, the resonance wavelength 30$w$3 is preferably the same as the wavelength of the light L having the minimum intensity between the peaks 91 and 92 adjacent to each other. With such a configuration, it is possible to suppress a decrease in the amount of emitted light as compared with a case where the wavelength of light excluding light having the minimum intensity between the peaks 91 and 92 is the same as the resonance wavelength 30$w$3.

In addition, from the viewpoint of suppressing the decrease in the amount of emitted light, the ratio of the intensity of the light having the resonance wavelength 30$w$3 in the light L from the light source unit 20 to the maximum intensity in the entire spectral distribution 90 is preferably 0.1 or less. With such a configuration, a decrease in the amount of emitted light can be suppressed as compared with a case where the ratio exceeds 0.1. Furthermore, with such a configuration, it is possible to easily emit light of a desired color tone as compared with a case where the ratio exceeds 0.1. The ratio is more preferably zero. However, this ratio may be greater than 0.1. In addition, from the viewpoint of suppressing a decrease in the amount of emitted light, the ratio of the amount of light of the resonance wavelength 30$w$3 in the light L from the light source unit 20 to the amount of light of the entire light L from the light source unit 20 is preferably less than 4%.

In addition, in the vehicular lamp 1 of the present embodiment, as described above, the meta-lens 30 reduce the divergence angle of the light L from the light source unit 20 passing through the meta-lens 30. Therefore, since the sunlight L2 passing through the meta-lens 30 is condensed and emitted to the light source unit 20, there is a high possibility that the light source unit 20 is deteriorated as compared with the case where the meta-lens 30 increases the divergence angle of the light L from the light source unit 20. Therefore, the vehicular lamp 1 of the present embodiment is particularly useful when the divergence angle of the light L from the light source unit 20 is reduced.

In addition, the vehicular lamp 1 of the present embodiment includes the housing 10 that accommodates the light source unit 20 and the meta-lens 30. In such a vehicular lamp 1, depending on the entrance angle of the sunlight L2 on the meta-lens 30, the sunlight L2 passing through the meta-lens 30 may be applied to the inner surface of the housing 10. According to the vehicular lamp 1 of the present embodiment, when the sunlight L2 passes through the meta-lens 30 and is emitted to the housing 10, the irradiation amount of the light having the wavelength of 800 nm to 2400 nm of the sunlight L2 to the inner surface of the housing 10 can be reduced as compared with the case where the meta-lens 30 is used as the projection lens.

The vehicular lamp 1 including the meta-lens 30 having at least one resonance wavelength of 800 nm or more and less than 2400 nm has been described by taking the seventh embodiment as an example. However, the vehicular lamp 1 is not limited thereto. A modification of the seventh embodiment will be described below.

For example, in the seventh embodiment, the meta-lens 30 including the resonance wavelength 30w3 in which the plurality of resonance wavelengths are included in the wavelength band of the light L emitted from the light source unit 20 has been described as an example. However, all of the plurality of resonance wavelengths in the meta-lens 30 may not be included in the wavelength band of the light L emitted from the light source unit 20. In other words, the light L emitted from the light source unit 20 may not include all of the plurality of resonance wavelengths in the meta-lens 30. With such a configuration, it is possible to emit light of a desired color tone as compared with a case where at least one resonance wavelength is included in the wavelength band of the light L emitted from the light source unit 20.

In addition, in the seventh embodiment, the meta-lens 30 in which all of the plurality of resonance wavelengths are different from the respective wavelengths of the plurality of peaks has been described as an example. However, from the viewpoint of emitting light of a desired color tone, the plurality of resonance wavelengths may be different from the respective wavelengths of the plurality of peaks, and for example, a specific resonance wavelength may be the same as the wavelength of a certain peak. From the viewpoint of emitting light of a desired color tone, all of the plurality of resonance wavelengths are preferably different from the respective wavelengths of the plurality of peaks.

In addition, from the viewpoint of emitting light of a desired color tone, it is preferable that the light transmittance distribution of the meta-lens 30 includes a plurality of continuous resonance wavelength bands in which the relative transmittance based on the maximum transmittance of the light L passing through the meta-lens 30 from the light source unit 20 is 80% or less and one resonance wavelength is included, and at least one of these resonance wavelength bands is different from each wavelength of the plurality of peaks. In this case, it is more preferable that all of these resonance wavelength bands are different from the respective wavelengths of the plurality of peaks. In the case that the relative transmittance based on the maximum transmittance of light L from light source unit 20 that passes through meta-lens 30 is 60% or less in the light transmittance distribution of meta-lens 30, and the plurality of continuous resonance wavelength bands including one resonance wavelength is included, it is more preferable that at least one of the resonance wavelength bands is different from each wavelength of the plurality of peaks. In this case, it is more preferable that all of these resonance wavelength bands are different from the respective wavelengths of the plurality of peaks. In the case that the relative transmittance based on the maximum transmittance of light L from light source unit 20 that passes through meta-lens 30 is 40% or less in the light transmittance distribution of meta-lens 30, and the plurality of continuous resonance wavelength bands including one resonance wavelength is included, it is more preferable that at least one of the resonance wavelength bands is different from each wavelength of the plurality of peaks. In this case, it is more preferable that all of these resonance wavelength bands are different from the respective wavelengths of the plurality of peaks.

Figure 19:
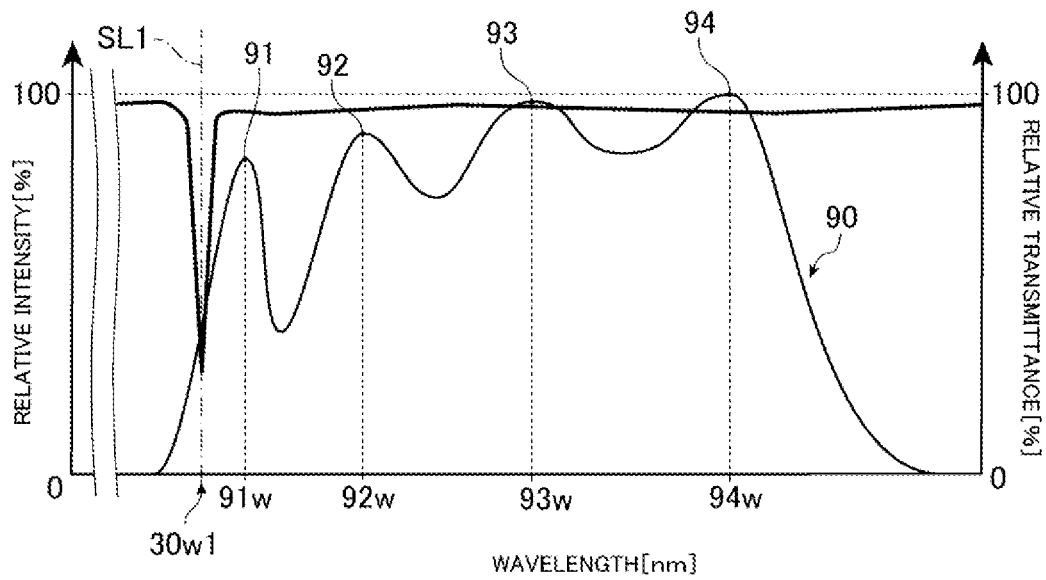
FIG. 19 is a diagram illustrating a spectral distribution of light emitted from a light source unit and a transmittance distribution of light of a meta-lens according to a fifth modification, similarly to FIG. 17.

Note that, from the viewpoint of easily emitting light of a desired color tone, for example, the longest resonance wavelength in the meta-lens may be shorter than the shortest wavelength among the wavelengths at the peak of the spectral distribution of the light from the light source unit, unlike the seventh embodiment. That is, the light source unit and the meta-lens may be configured as described above. Hereinafter, such a modification will be described with reference to FIG. 19. Note that the same or equivalent components as those of the seventh embodiment are denoted by the same reference numerals and redundant description is omitted unless otherwise specified. FIG. 19 is a view illustrating spectral distribution 90 of the light emitted from light source unit 20 according to a fifth modification and transmittance distribution of the light of meta-lens 30 similarly to FIG. 17. In the present modification, the resonance wavelength of the meta-lens 30 is different from the resonance wavelength in the above embodiment. In addition, the spectral distribution 90 is the same as the spectral distribution 90 of the above embodiment, but may be different. In addition, the longest resonance wavelength 30w1 in the meta-lens 30 is included in the wavelength band of the light L from the light source unit 20. However, as described above, the longest resonance wavelength 30w1 is shorter than the shortest wavelength 91w among the wavelengths 91w, 92w, 93w, and 94w at each of the plurality of peaks 91, 92, 93, and 94. Therefore, all of the plurality of resonance wavelengths in meta-lens 30 are shorter than wavelength 91w. According to the vehicular lamp 1 of the present modification, it is possible to suppress a decrease in the transmittance of the light having a wavelength that greatly affects the color tone of the emitted light in the meta-lens as compared with the case where the longest resonance wavelength 30w1 in the meta-lens 30 is longer than the shortest wavelength 91w. Therefore, according to the vehicular lamp 1 of the present modification, it is possible to easily emit light of a desired color tone as compared with the above case. Note that, from the viewpoint of easily emitting light of a desired color tone, the longest resonance wavelength 30w1 in the meta-lens 30 may be shorter than the shortest wavelength in the wavelength band of the light L from the light source unit 20. Furthermore, from this viewpoint, the longest resonance wavelength 30w1 in the meta-lens 30 may be shorter than the shortest wavelength in the wavelength band of visible light, for example, 380 nm. That is, the meta-lens 30 may be configured as described above.

(Eighth Embodiment)

Next, an eighth embodiment of the present invention will be described. Note that the same or equivalent components as those of the first embodiment are denoted by the same reference numerals and redundant description is omitted unless otherwise specified. The present embodiment is different from the first embodiment in the configurations of the light source unit 20 and the meta-lens 30.

Figure 20:
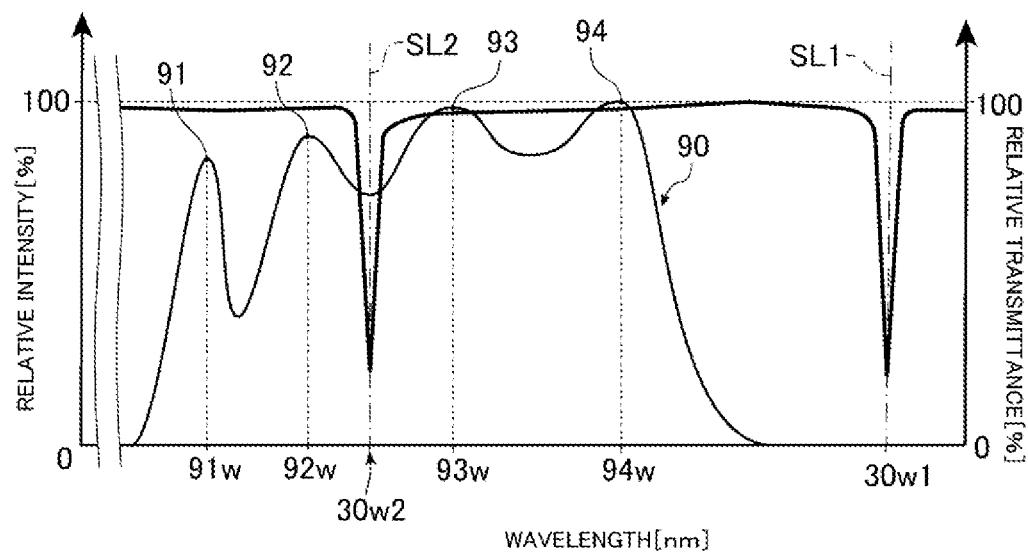
FIG. 20 is a diagram schematically illustrating a spectral distribution of light emitted from a light source unit and a transmittance distribution of light of a meta-lens in an eighth embodiment.

FIG. 20 is a diagram schematically illustrating a spectral distribution of light emitted from the light source unit 20 and a transmittance distribution of light of the meta-lens 30 in the present embodiment. In FIG. 20, a horizontal axis represents a wavelength, a first vertical axis represents a relative intensity based on a maximum intensity, and a second vertical axis represents a relative transmittance based on a maximum transmittance. In FIG. 20, the spectral distribution is indicated by a thin line, and the transmittance is indicated by a thick line. As illustrated in FIG. 20, in the present embodiment, the spectral distribution 90 has four peaks 91, 92, 93, and 94. Wavelengths 91$w$, 92$w$, 93$w$, and 94$w$ at the peaks 91, 92, 93, and 94 increase in the order of the wavelength 91$w$, the wavelength 92$w$, the wavelength 93$w$, and the wavelength 94$w$. The wavelength 91$w$ is approximately 410 nm, the wavelength 92$w$ is approximately 460 nm, the wavelength 93$w$ is approximately 530 nm, and the wavelength 94$w$ is approximately 620 nm. Therefore, among the wavelengths 91$w$, 92$w$, 93$w$, and 94$w$ at the plurality of peaks 91, 92, 93, and 94, the wavelength 91$w$ is the shortest and the wavelength 94$w$ is the longest. The wavelengths 91$w$, 92$w$, 93$w$, and 94$w$ at the peaks 91, 92, 93, and 94 are included in a wavelength band of visible light. Note that the spectral distribution 90 may have a peak that is not included in the wavelength band of visible light. In addition, since the light L emitted from the light source unit 20 is light emitted from the plurality of light emitting elements 21, the spectral distribution of the light emitted from each light emitting element 21 is substantially the same as the spectral distribution 90 illustrated in FIG. 20.

In the present embodiment, the shape of the nanostructure 35 is a columnar shape, and the diameter is smaller than the wavelength 94$w$ of the peak 94 illustrated in FIG. 20. Note that the width of the nanostructure 35 may be smaller than the longest wavelength 94$w$ of the wavelengths at the peaks 91, 92, 93, and 94, and the shape of the nanostructure 35 is not particularly limited.

As described in the seventh embodiment, the resonance wavelength in the meta-lens is determined according to the size and shape of the nanostructure in each cell, the refractive index of the material constituting the nanostructure, and the like. In the present embodiment, all of the plurality of resonance wavelengths in the meta-lens 30 are different from wavelengths 91$w$, 92$w$, 93$w$, and 94$w$ at respective peaks 91, 92, 93, and 94. Furthermore, as illustrated in FIG. 20, among the plurality of resonance wavelengths in the meta-lens 30, the longest resonance wavelength 30$w$1 is longer than the wavelength 94$w$, and the second longest resonance wavelength 30$w$2 is included in the wavelength band of the light L from the light source unit 20. In FIG. 20, alternate long and short dash lines SL1 and SL2 indicating these resonance wavelengths 30$w$1 and 30$w$2 are illustrated. In the present embodiment, the second longest resonance wavelength 30$w$2 exceeds the shortest wavelength 91$w$ among the wavelengths 91$w$, 92$w$, 93$w$, and 94$w$ and is less than the longest wavelength 92$w$. In a case where the plurality of resonance wavelengths do not include a resonance wavelength that exceeds the shortest wavelength 91$w$ and is less than the longest wavelength 94$w$, design of the size and shape of the nanostructure 35, the arrangement of the cells 33, and the like in each cell 33 tends to be complicated. Therefore, in the present embodiment, it is possible to suppress the complexity of these designs. Note that the plurality of resonance wavelengths may not include a resonance wavelength that exceeds the wavelength 91$w$ and is less than the wavelength 94$w$. In the present embodiment, the wavelength of the light from the light source unit 20 having the minimum intensity between the peaks 91, 92, 93, and 94 adjacent to each other among the peaks 92 and 93 is the same as the second longest resonance wavelength 30$w$2. Note that the wavelength of the light from the light source unit 20 having the minimum intensity between the peaks 92 and 93 may be different from the resonance wavelength 30$w$2. In addition, the resonance wavelength 30$w$2 may be a wavelength between the peaks 91 and 92 or a wavelength between the peaks 93 and 94, and the wavelength of light from the light source unit 20 having the minimum intensity between these peaks and the resonance wavelength 30$w$2 may be the same or different. The plurality of resonance wavelengths in the meta-lens 30 may include a plurality of resonance wavelengths that are longer than shortest wavelength 91$w$ and shorter than longest wavelength 94$w$.

In the light emitting module of Patent Document 3 described above, the color tone of the emitted light can be adjusted by appropriately selecting the wavelength of the light emitted from the LED and the phosphor. Therefore, it is considered that light of a desired color tone can be emitted from the vehicular lamp by using such a light emitting module in the light source unit of the vehicular lamp. In the vehicular lamp 1 of the present embodiment, as described above, the spectral distribution 90 of the light emitted from the light source unit 20 has the plurality of peaks 91, 92, 93, and 94. Therefore, according to the vehicular lamp 1 of the present embodiment, the color tone of the emitted light can be set to a desired color tone as compared with the case where the spectral distribution 90 has only one peak. In addition, the plurality of resonance wavelengths in the meta-lens 30 of the present embodiment are different from the wavelengths 91$w$, 92$w$, 93$w$, and 94$w$ of the plurality of peaks 91, 92, 93, and 94, respectively. The light having the wavelengths 91$w$, 92$w$, 93$w$, and 94$w$ at the plurality of peaks 91, 92, 93, and 94 has a great influence on the color tone of the light emitted from the vehicular lamp 1. Therefore, according to the vehicular lamp 1 of the present embodiment, it is possible to suppress a decrease in the transmittance of the light having the wavelengths 91$w$, 92$w$, 93$w$, and 94$w$, which greatly affect the color tone of the emitted light, at the meta-lens 30, and to emit light having a desired color tone.

In the vehicular lamp 1 of the present embodiment, the plurality of resonance wavelengths in the meta-lens 30 include a resonance wavelength 30$w$2 that exceeds the shortest wavelength 91$w$ among the wavelengths 91$w$, 92$w$, 93$w$, and 94$w$ of the plurality of peaks 91, 92, 93, and 94 and is less than the longest wavelength 94$w$. In addition, the wavelength of the light from the light source unit 20 having the minimum intensity between the peaks 92 and 93 adjacent to each other is the same as the resonance wavelength 30$w$2. With such a configuration, it is possible to suppress a decrease in the amount of emitted light as compared with a case where the wavelength of light excluding light having the minimum intensity between the peaks 92 and 93 is the same as the resonance wavelength 30$w$2.

The vehicular lamp 1 including the light source unit 20 in which the spectral distribution of the emitted light has the plurality of peaks and the meta-lens 30 in which the plurality of resonance wavelengths are different from the respective wavelengths of the plurality of peaks has been described using the eighth embodiment as an example. However, the vehicular lamp 1 is not limited thereto. A modification of the eighth embodiment will be described below.

Figure 21:
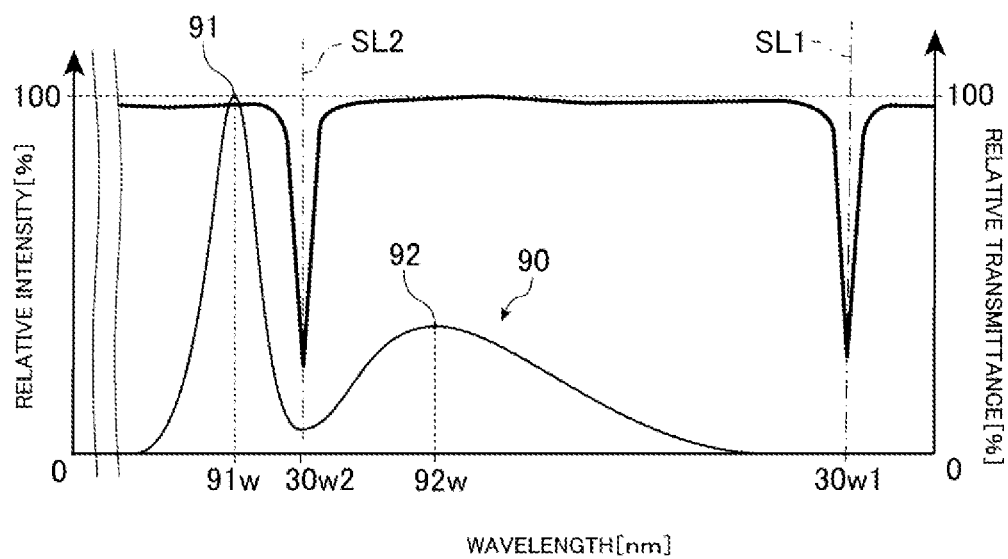
FIG. 21 is a diagram illustrating a spectral distribution of light emitted from a light source unit and a transmittance distribution of light of a meta-lens according to a sixth modification, similarly to FIG. 20.

For example, in the eighth embodiment, the light source unit 20 that emits the light L in which the spectral distribution 90 has the four peaks 91, 92, 93, and 94 has been described as an example. However, the light source unit 20 may be configured to emit light having a plurality of peaks in spectral distribution. For example, the light source unit 20 may include a light shielding plate that shields a part of the light emitted from the light emitting element 21, or may include a reflecting plate that reflects at least a part of the light emitted from the light emitting element 21. In addition, the number of peaks of the spectral distribution 90 of the light L emitted from the light source unit 20 is not particularly limited. For example, the light source unit 20 may be configured to emit light having a spectral distribution illustrated in FIG. 21. Note that FIG. 21 is a diagram illustrating a spectral distribution of light emitted from a light source unit and a transmittance distribution of light of a meta-lens according to a sixth modification, similarly to FIG. 20. Hereinafter, the sixth modification in which the spectral distribution of the light emitted from the light source unit becomes the spectral distribution illustrated in FIG. 21 will be described. Note that the same or equivalent components as those of the eighth embodiment are denoted by the same reference numerals and redundant description is omitted unless otherwise specified.

The spectral distribution 90 in the present modification has two peaks 91 and 92. A wavelength $91w$ at the peak 91 is shorter than a wavelength $92w$ at the peak 92. In the present modification, the wavelength $91w$ is approximately 460 nm, and the wavelength $92w$ is approximately 570 nm. In addition, the intensity at the peak 91 is higher than the intensity at the peak 92, and is the maximum in the entire spectral distribution 90. In addition, the diameter of the nanostructure 35 in the present modification is smaller than the wavelength $92w$ at the peak 92. In addition, all of the plurality of resonance wavelengths in meta-lens 30 of the present modification are different from wavelengths $91w$ and $92w$ of two peaks 91 and 92, respectively. Therefore, similarly to the first embodiment, the vehicular lamp 1 of the present modification can emit light of a desired color tone as compared with the case where the wavelengths are the same as the wavelengths $91w$ and $92w$ at the peaks 91 and 92 of at least one pair of the plurality of resonance wavelengths.

In addition, the second longest resonance wavelength $30w2$ exceeds the shortest wavelength $91w$ of the wavelengths $91w$ and $92w$ and is less than the longest wavelength $92w$. That is, the plurality of resonance wavelengths include a resonance wavelength $30w2$ that exceeds the shortest wavelength $91w$ among the wavelengths $91w$ and $92w$ and is less than the longest wavelength $92w$. Therefore, according to the present modification, as in the first embodiment, it is possible to suppress complication of design of the size and shape of the nanostructure 35, the arrangement of the cells 33, and the like in each cell 33.

In the present modification, the wavelength of the light from the light source unit 20 having the minimum intensity between the peaks 91 and 92 adjacent to each other is the same as the resonance wavelength $30w2$. Therefore, according to the present modification, as in the eighth embodiment, it is possible to suppress a decrease in the amount of emitted light as compared with a case where the wavelength of light excluding light having the minimum intensity between the peaks 91 and 92 and the resonance wavelength $30w2$ are the same.

Furthermore, in the present modification, the plurality of resonance wavelengths in the meta-lens 30 include a resonance wavelength $30w2$ included in the wavelength band of the light L from the light source unit 20. The maximum intensity in the entire spectral distribution 90 is the intensity at the peak 91, and the ratio of the intensity of the light having the resonance wavelength $30w2$ in the light L from the light source unit 20 to the intensity is 0.1 or less. Therefore, according to the present modification, a decrease in the amount of emitted light can be suppressed as compared with the case where the ratio exceeds 0.1. Furthermore, with such a configuration, it is possible to easily emit light of a desired color tone as compared with a case where the ratio exceeds 0.1. The ratio is more preferably zero. However, this ratio may be greater than 0.1. In addition, from the viewpoint of suppressing a decrease in the amount of emitted light, the ratio of the amount of light having the same wavelength as the resonance wavelength $30w2$ in the light L from the light source unit 20 to the amount of light of the entire light L from the light source unit 20 is preferably less than 4%.

In the eighth embodiment and the sixth modification, the meta-lens 30 in which the second longest resonance wavelength $30w2$ is included in the wavelength band of the light L from the light source unit 20 has been described as an example. However, the longest resonance wavelength $30w1$ may be included in the wavelength band of the light L from the light source unit 20, and all the resonance wavelengths may not be included in the wavelength band of the light L from the light source unit 20.

In addition, in the eighth embodiment and the sixth modification, the meta-lens 30 in which all of the plurality of resonance wavelengths are different from the respective wavelengths of the plurality of peaks has been described as an example. However, the plurality of resonance wavelengths may be different from the respective wavelengths of the plurality of peaks, and for example, a specific resonance wavelength may be the same as a wavelength of a certain peak. From the viewpoint of emitting light of a desired color tone, all of the plurality of resonance wavelengths are preferably different from the respective wavelengths of the plurality of peaks.

In addition, from the viewpoint of emitting light of a desired color tone, it is preferable that the light transmittance distribution of the meta-lens 30 includes a plurality of continuous resonance wavelength bands in which the relative transmittance based on the maximum transmittance of the light L passing through the meta-lens 30 from the light source unit 20 is 80% or less and one resonance wavelength is included, and at least one of these resonance wavelength bands is different from each wavelength of the plurality of peaks. In this case, it is more preferable that all of these resonance wavelength bands are different from the respective wavelengths of the plurality of peaks. In the case that the relative transmittance based on the maximum transmittance of light L from light source unit 20 that passes through the meta-lens 30 is 60% or less in the light transmittance distribution of meta-lens 30, and the plurality of continuous resonance wavelength bands including one resonance wavelength are included, it is more preferable that at least one of the resonance wavelength bands is different from each wavelength of the plurality of peaks. In this case, it is more preferable that all of these resonance wavelength bands are different from the respective wavelengths of the plurality of peaks. In the case that the relative transmittance based on the maximum transmittance of light L from light source unit 20 that passes through meta-lens 30 is 40% or less in the light transmittance distribution of meta-lens 30, and the plurality of continuous resonance wavelength bands including one resonance wavelength is included, it is more preferable that at least one of the resonance wavelength bands is different from each wavelength of the plurality of peaks. In this case, it is more preferable that all of these resonance wavelength bands are different from the respective wavelengths of the plurality of peaks.

As described above, the present invention has been described by taking the above-described embodiments and modifications as examples, but the present invention is not limited thereto.

For example, in the above embodiment, the vehicular lamp 1 is a headlight, but is not particularly limited. For example, the vehicular lamp 1 may irradiate an irradiated object such as a road surface with light constituting an image. In addition, in a case where the vehicular lamp is configured to irradiate the irradiated object such as a road surface with light constituting an image, a direction of light emitted by the vehicular lamp or a position where the vehicular lamp is attached to the vehicle is not particularly limited. In addition, the color of the light emitted from the vehicular lamp is not limited to white.

In the above embodiment, the meta-lens 30 that reduces the divergence angle of the light L from the light source unit 20 has been described as an example. However, the meta-lens 30 may be configured to increase the divergence angle of the light L from the light source unit 20.

Further, in the above embodiment, the meta-lens 30 in which the main surface 32s and the main surface 31s as the meta region are planar has been described as an example. However, the main surface 31s or the main surface 32s as the meta region may have a curved surface shape. However, from the viewpoint of thinning the meta-lens 30, the main surface 31s and the main surface 32s as the meta region are preferably planar.

In the first to fourth embodiments, the specific phase distribution 60 having three or more peaks 61 has been described as an example. However, the number of peaks 61 is not particularly limited, and for example, the specific phase distribution 60 may not have the peak 61.

According to the present invention, a vehicular lamp that can be downsized is provided, and can be used in the field of vehicular lamps for automobiles and the like.

The invention claimed is:

1. A vehicular lamp comprising:
    a light source unit; and
    a meta-lens in which a plurality of cells including a nanostructure smaller than a longest wavelength of light emitted from the light source unit are arranged, the meta-lens having a meta region through which the light emitted from the light source unit passes,
    wherein the meta region changes a phase distribution of the light passing through the meta region;
    wherein the meta region changes a phase distribution of a reference light so that the phase distribution of the reference light emitted from the meta-lens becomes a specific phase distribution obtained by dividing a predetermined phase distribution by $2\pi$ when the reference light parallel to a reference axis orthogonal to the meta region is incident on the meta region at a specific position in the meta region,
    the predetermined phase distribution is a phase distribution in which a phase delay amount (rad) decreases and a reduction rate of the phase delay amount increases with distance from the reference axis,
    the specific phase distribution has a plurality of peaks, and
    the plurality of cells are arranged such that two or more of the cells are located between the peaks adjacent to each other in a direction away from the specific position when viewed along the reference axis.

2. The vehicular lamp according to claim 1, wherein the specific phase distribution has three or more of the peaks, and
    the number of the cells located between the peaks decreases with distance from the specific position.

3. The vehicular lamp according to claim 1, wherein a shape of the nanostructure is a columnar shape, and
    the number of the cells located between the peaks is three or more.

4. A vehicular lamp comprising:
    a light source unit; and
    a meta-lens in which a plurality of cells including a nanostructure smaller than a longest wavelength of light emitted from the light source unit are arranged, the meta-lens having a meta region through which the light emitted from the light source unit passes,
    wherein the meta region changes a phase distribution of the light passing through the meta region;
    wherein in the meta region, a bending force of the meta region that bends infrared light included in the light passing through the meta region is smaller than a bending force of the meta region that bends visible light included in the light passing through the meta region.

5. The vehicular lamp according to claim 4, wherein the meta region is configured such that a phase modulation amount of the infrared light is less than 0.6 times a phase modulation amount of the visible light in the visible light and the infrared light having a wavelength ratio of 1:1.5.

6. The vehicular lamp according to claim 4, wherein a longest wavelength of the visible light is 660 nm, and
    a shortest wavelength of the infrared light is 1000 nm.

7. The vehicular lamp according to claim 4, wherein a shape of the nanostructure is a columnar shape.

8. A vehicular lamp comprising:
    a light source unit; and
    a meta-lens in which a plurality of cells including a nanostructure smaller than a longest wavelength of light emitted from the light source unit are arranged, the meta-lens having a meta region through which the light emitted from the light source unit passes,
    wherein the meta region changes a phase distribution of the light passing through the meta region;
    wherein at least one resonance wavelength in the meta-lens is 800 nm or more and less than 2400 nm;
    wherein a spectral distribution of the light emitted from the light source unit has a plurality of peaks, and
    a plurality of the resonance wavelengths are different from respective wavelengths of a plurality of the peaks.

9. The vehicular lamp according to claim 8, wherein the at least one resonance wavelength is included in a range of 800 nm or more and less than 900 nm.

10. The vehicular lamp according to claim 8, wherein all of the plurality of resonance wavelengths are not included in a wavelength band of the light emitted from the light source unit.

11. The vehicular lamp according to claim 8, wherein the meta-lens reduces a divergence angle of the light passing through the meta-lens from the light source unit.

* * * * *